(12) United States Patent
Arbore et al.

(10) Patent No.: US 12,111,210 B2
(45) Date of Patent: Oct. 8, 2024

(54) LIGHT SOURCE MODULES FOR NOISE MITIGATION

(71) Applicant: Apple Inc., Cupertino, CA (US)

(72) Inventors: Mark Alan Arbore, Los Altos, CA (US); Thomas C. Greening, San Jose, CA (US); Yongming Tu, Redwood City, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/859,912

(22) Filed: Jul. 7, 2022

(65) Prior Publication Data
US 2023/0012376 A1    Jan. 12, 2023

Related U.S. Application Data

(60) Provisional application No. 63/219,483, filed on Jul. 8, 2021.

(51) Int. Cl.
*G01J 3/02*        (2006.01)
*G01J 3/10*        (2006.01)
(Continued)

(52) U.S. Cl.
CPC .............. *G01J 3/0297* (2013.01); *G01J 3/10* (2013.01); *G01J 3/108* (2013.01); *G01J 3/1809* (2013.01);
(Continued)

(58) Field of Classification Search
CPC .. G01J 3/0297; G01J 3/10; G01J 3/108; G01J 3/1809; G01J 3/32; G01J 3/45;
(Continued)

(56) References Cited

U.S. PATENT DOCUMENTS

| 4,897,711 A | 1/1990 | Blonder |
| 5,037,779 A | 8/1991 | Whalley |
| (Continued) | | |

FOREIGN PATENT DOCUMENTS

| CN | 206546453 | 10/2017 |
| DE | 102004025775 | 4/2005 |
| (Continued) | | |

OTHER PUBLICATIONS

Bogaerts, et al., "Off-Chip Coupling," *Handbook of Silicon Photonics*, CRC Press, Apr. 2013, 43 pages.
(Continued)

*Primary Examiner* — Tarifur R Chowdhury
*Assistant Examiner* — Carlos Perez-Guzman
(74) *Attorney, Agent, or Firm* — Brownstein Hyatt Farber Schreck, LLP

(57) ABSTRACT

Configurations for light source modules and methods for mitigating coherent noise are disclosed. The light source modules may include multiple light source sets, each of which may include multiple light sources. The light emitted by the light sources may be different wavelengths or the same wavelength depending on whether the light source module is providing redundancy of light sources, increased power, coherent noise mitigation, and/or detector mitigation. In some examples, the light source may emit light to a coupler or a multiplexer, which may then be transmitted to one or more multiplexers. In some examples, the light source modules provide one light output and in other examples, the light source modules provide two light outputs. The light source modules may provide light with approximately zero loss and the wavelengths of light may be close enough to spectroscopically equivalent respect to a sample and far enough apart to provide coherent noise mitigation.

10 Claims, 11 Drawing Sheets

(51) Int. Cl.
*G01J 3/18* (2006.01)
*G01J 3/32* (2006.01)
*G01J 3/45* (2006.01)
*G02B 6/293* (2006.01)
*G02B 6/42* (2006.01)
*G02B 27/10* (2006.01)
*G02F 1/21* (2006.01)

(52) U.S. Cl.
CPC . *G01J 3/32* (2013.01); *G01J 3/45* (2013.01); *G02B 6/2938* (2013.01); *G02B 6/4215* (2013.01); *G02B 27/10* (2013.01); *G01J 2003/102* (2013.01); *G02F 1/212* (2021.01)

(58) Field of Classification Search
CPC ............. G01J 2003/102; G02B 6/2938; G02B 6/4215; G02B 27/10; G02F 1/212
See application file for complete search history.

(56) References Cited

U.S. PATENT DOCUMENTS

| | | |
|---|---|---|
| 5,109,455 A | 4/1992 | Niswonger |
| 5,479,540 A | 12/1995 | Boudreau |
| 5,488,678 A | 1/1996 | Taneya |
| 5,577,142 A | 11/1996 | Mueller-Fiedler et al. |
| 5,604,160 A | 2/1997 | Warfield |
| 5,981,945 A | 11/1999 | Spaeth |
| 6,074,104 A | 6/2000 | Higashikawa |
| 6,228,675 B1 | 5/2001 | Ruby |
| 6,330,378 B1 | 12/2001 | Forrest |
| 6,367,988 B1 | 4/2002 | Auracher |
| 6,393,185 B1 | 5/2002 | Deacon |
| 6,461,059 B2 | 10/2002 | Ando et al. |
| 6,465,929 B1 | 10/2002 | Levitan et al. |
| 6,519,382 B1 | 2/2003 | Jurbergs |
| 6,588,949 B1 | 7/2003 | Zhou |
| 6,594,409 B2 | 7/2003 | Dutt et al. |
| 6,628,858 B2 | 9/2003 | Zhang |
| 6,632,027 B1 | 10/2003 | Yoshida |
| 6,657,723 B2 | 12/2003 | Cohen |
| 6,759,668 B2 | 7/2004 | Matsuo et al. |
| 6,767,753 B2 | 7/2004 | Huang |
| 6,786,654 B2 | 9/2004 | Kilian |
| 6,795,622 B2 | 9/2004 | Forrest |
| 6,798,931 B2 | 9/2004 | Kathman et al. |
| 6,801,679 B2 | 10/2004 | Koh |
| 6,801,683 B2 | 10/2004 | Kanie et al. |
| 6,821,032 B2 | 11/2004 | Lake et al. |
| 6,823,098 B2 | 11/2004 | Guidotti et al. |
| 6,856,717 B2 | 2/2005 | Kilian |
| 6,873,763 B2 | 3/2005 | Nikonov |
| 6,894,358 B2 | 5/2005 | Leib |
| 6,898,222 B2 | 5/2005 | Hennig et al. |
| 6,904,191 B2 | 6/2005 | Kubby |
| 6,932,519 B2 | 8/2005 | Steinberg |
| 6,935,792 B2 | 8/2005 | Saia et al. |
| 6,940,182 B2 | 9/2005 | Hilton et al. |
| 6,947,639 B2 | 9/2005 | Singh |
| 6,952,504 B2 | 10/2005 | Bi |
| 6,955,481 B2 | 10/2005 | Colgan et al. |
| 6,964,881 B2 | 11/2005 | Chua et al. |
| 6,969,204 B2 | 11/2005 | Kilian |
| 6,975,465 B1 | 12/2005 | Chung |
| 7,054,517 B2 | 5/2006 | Mossberg |
| 7,058,245 B2 | 6/2006 | Farahi |
| 7,062,114 B2 | 6/2006 | Webjorn |
| 7,071,521 B2 | 7/2006 | Leib et al. |
| 7,079,715 B2 | 7/2006 | Kish |
| 7,085,445 B2 | 8/2006 | Koh |
| 7,165,896 B2 | 1/2007 | Hauffe et al. |
| 7,203,401 B2 | 4/2007 | Mossberg |
| 7,209,611 B2 | 4/2007 | Joyner |
| 7,213,978 B2 | 5/2007 | Kuhmann |
| 7,223,619 B2 | 5/2007 | Wang |
| 7,245,379 B2 | 7/2007 | Schwabe |
| 7,283,694 B2 | 10/2007 | Welch |
| 7,335,986 B1 | 2/2008 | Paek |
| 7,358,109 B2 | 4/2008 | Gallup et al. |
| 7,366,364 B2 | 4/2008 | Singh |
| 7,426,347 B2 | 9/2008 | Hnatiw et al. |
| 7,447,393 B2 | 11/2008 | Yan |
| 7,460,742 B2 | 12/2008 | Joyner |
| 7,477,384 B2 | 1/2009 | Schwabe |
| 7,483,599 B2 | 1/2009 | Dominic et al. |
| 7,519,246 B2 | 4/2009 | Welch et al. |
| 7,576,333 B2 | 8/2009 | Modavis |
| 7,577,327 B2 | 8/2009 | Blauvelt et al. |
| 7,612,881 B2 | 11/2009 | Ban et al. |
| 7,680,364 B2 | 3/2010 | Nilsson |
| 7,720,328 B2 | 5/2010 | Yan |
| 7,750,289 B2 | 7/2010 | Feldman |
| 7,812,264 B2 | 10/2010 | Yoneda et al. |
| 7,885,492 B2 | 2/2011 | Welch |
| 7,974,504 B2 | 7/2011 | Nagarajan |
| 8,105,514 B2 | 1/2012 | Hayashi |
| 8,198,109 B2 | 6/2012 | Lerman et al. |
| 8,318,057 B2 | 11/2012 | Harden |
| 8,417,071 B2 | 4/2013 | Hopkins et al. |
| 8,474,134 B2 | 7/2013 | Yoneda et al. |
| 8,548,287 B2 | 10/2013 | Thacker et al. |
| 8,563,358 B2 | 10/2013 | Landesberger et al. |
| 8,611,388 B2 | 12/2013 | Krasulick et al. |
| 8,638,485 B2 | 1/2014 | Feng et al. |
| 8,659,813 B2 | 2/2014 | Davis et al. |
| 8,735,191 B2 | 5/2014 | Marchena |
| 8,774,569 B2 | 7/2014 | Dougherty et al. |
| 8,859,394 B2 | 10/2014 | Dallesasse et al. |
| 8,916,587 B1 | 12/2014 | King et al. |
| 8,966,748 B2 | 3/2015 | Leib |
| 9,008,139 B2 | 4/2015 | Monadgemi |
| 9,031,412 B2 | 5/2015 | Nagarajan |
| 9,041,015 B2 | 5/2015 | Lai et al. |
| 9,064,988 B2 | 6/2015 | Hsiao et al. |
| 9,310,248 B2 | 4/2016 | Karlsen et al. |
| 9,395,494 B2 | 7/2016 | Krishnamurthi et al. |
| 9,396,914 B2 | 7/2016 | Steiner |
| 9,405,066 B2 | 8/2016 | Mahgerefteh |
| 9,702,975 B2 | 7/2017 | Brinkmeyer |
| 9,715,064 B1 | 7/2017 | Gambino et al. |
| 9,874,701 B2 | 1/2018 | Baets et al. |
| 9,880,352 B2 | 1/2018 | Florjanczyk |
| 9,923,105 B2 | 3/2018 | Krasulick et al. |
| 9,952,099 B2 | 4/2018 | Wijepans et al. |
| 10,009,668 B2 | 6/2018 | Liboiron-Ladouceur |
| 10,014,654 B2 | 7/2018 | Yim et al. |
| 10,046,229 B2 | 8/2018 | Tran et al. |
| 10,067,426 B2 | 9/2018 | Pandey |
| 10,203,762 B2 | 2/2019 | Bradski et al. |
| 10,268,043 B2 | 4/2019 | Zhou et al. |
| 10,283,939 B2 | 5/2019 | Dawson et al. |
| 10,295,740 B2 | 5/2019 | Bourstein et al. |
| 10,310,196 B2 | 6/2019 | Hutchison |
| 10,374,699 B2 | 8/2019 | Ji et al. |
| 10,429,582 B1 | 10/2019 | Bian et al. |
| 10,436,028 B2 | 10/2019 | Dai et al. |
| 10,495,813 B2 | 12/2019 | Mahgerefteh et al. |
| 10,511,146 B2 | 12/2019 | Lebby et al. |
| 10,529,003 B2 | 1/2020 | Mazed |
| 10,613,276 B2 | 4/2020 | Mansouri et al. |
| 10,634,843 B2 | 4/2020 | Bayn et al. |
| 10,656,429 B2 | 5/2020 | Zhou et al. |
| 10,823,912 B1 | 11/2020 | Pelc et al. |
| 10,897,122 B2 | 1/2021 | Mathai et al. |
| 10,985,524 B1 | 4/2021 | Bayn et al. |
| 11,086,088 B2 | 8/2021 | Huebner et al. |
| 11,181,688 B2 | 11/2021 | Krasulick et al. |
| 11,320,718 B1 | 5/2022 | Mahmoud et al. |
| 11,500,139 B2 | 11/2022 | Zhou et al. |
| 11,525,967 B1 | 12/2022 | Bismuto et al. |
| 11,881,678 B1 | 1/2024 | Bishop et al. |
| 2002/0031711 A1 | 3/2002 | Steinberg et al. |
| 2002/0110335 A1 | 8/2002 | Wagner et al. |

(56) References Cited

U.S. PATENT DOCUMENTS

| | | | |
|---|---|---|---|
| 2004/0208428 A1* | 10/2004 | Kikuchi | H04B 10/503 385/24 |
| 2005/0151094 A1* | 7/2005 | Kitagawa | G01J 3/4406 250/458.1 |
| 2005/0205951 A1 | 9/2005 | Eskridge et al. | |
| 2006/0002443 A1 | 1/2006 | Farber et al. | |
| 2006/0045144 A1 | 3/2006 | Karlsen et al. | |
| 2006/0045158 A1 | 3/2006 | Li | |
| 2006/0182445 A1* | 8/2006 | Lee | H04J 14/0282 398/72 |
| 2008/0044128 A1 | 2/2008 | Kish et al. | |
| 2009/0103580 A1 | 4/2009 | Farmer et al. | |
| 2011/0069731 A1 | 3/2011 | Gokay | |
| 2011/0158651 A1 | 6/2011 | Tang et al. | |
| 2014/0029943 A1 | 1/2014 | Mathai et al. | |
| 2014/0160751 A1 | 6/2014 | Hogan et al. | |
| 2018/0113216 A1 | 4/2018 | Kremer et al. | |
| 2019/0004151 A1 | 1/2019 | Abediasl et al. | |
| 2019/0011639 A1 | 1/2019 | Abediasl et al. | |
| 2019/0204419 A1 | 7/2019 | Baba et al. | |
| 2019/0339468 A1 | 11/2019 | Evans | |
| 2019/0342009 A1 | 11/2019 | Evans | |
| 2019/0342010 A1 | 11/2019 | Evans et al. | |
| 2020/0152615 A1 | 5/2020 | Krasulick et al. | |
| 2020/0256956 A1 | 8/2020 | Luff et al. | |
| 2020/0343695 A1 | 10/2020 | Mathai et al. | |
| 2020/0393615 A1 | 12/2020 | Bayn et al. | |
| 2022/0021179 A1 | 1/2022 | Lee et al. | |
| 2022/0128666 A1 | 4/2022 | Schrans et al. | |
| 2022/0221649 A1* | 7/2022 | Sakamoto | G02B 6/12019 |
| 2023/0085761 A1 | 3/2023 | Witmer et al. | |
| 2023/0107907 A1 | 4/2023 | Bismuto et al. | |
| 2023/0228945 A1 | 7/2023 | Shah et al. | |
| 2023/0277062 A1 | 9/2023 | Dalvi et al. | |
| 2023/0324286 A1 | 10/2023 | Pelc et al. | |
| 2024/0102856 A1 | 3/2024 | Terrel et al. | |

FOREIGN PATENT DOCUMENTS

| | | |
|---|---|---|
| DE | 102004063569 | 9/2005 |
| DE | 60219161 T2 | 12/2007 |
| JP | H07297324 | 11/1995 |
| JP | 2006186288 | 7/2006 |
| JP | 2018518836 | 7/2018 |
| JP | 2021139832 | 9/2021 |
| WO | WO 00/041281 | 7/2000 |
| WO | WO 06/030611 | 3/2006 |
| WO | WO 07/100037 | 9/2007 |
| WO | WO 14/141451 | 9/2014 |
| WO | WO 17/184524 | 10/2017 |
| WO | WO 19/152990 | 8/2019 |
| WO | WO-2020086744 A1 * | 4/2020 |
| WO | WO 20/106974 | 5/2020 |
| WO | WO 20/180612 | 9/2020 |
| WO | WO 21/116766 | 6/2021 |
| WO | WO 22/029486 | 2/2022 |

OTHER PUBLICATIONS

Chang et al., "A Comb-Drive Actuator Driven by Capacitively-Coupled-Power," *Sensors*, 2012, pp. 10881-10889.

Dhoore et al., "Novel adiabatic tapered couplers for active III-V/SOI devices fabricated through transfer printing," Ghent University, Belgium, Optical Society of America, 2016, 16 pages.

He et al., "Integrated Polarization Compensator for WDM Waveguide Demultiplexers," *IEEE Photonics Technology Letters* vol. 11, No. 2, Feb. 1999, pp. 224-226.

Holmström et al., "MEMS Laser Scanners: A Review," *Journal of Microelectromechanical Systems*, vol. 23, No. 2, 2014, pp. 259-275.

Komljenovic et al., "Photonic Integrated Circuits Using Heterogeneous Integration on Silicon," Proceedings of the IEEE 2018, pp. 1-12.

Lapedus, "Electroplating IC Packages—Tooling challenges increase as advanced packaging ramps up," *Semiconductor Engineering*, https://semiengineering.com/electroplating-ic-packages, Apr. 10, 2017, 22 pages.

Materials and Processes for Electronic Applications, Series Editor: James J. Licari, AvanTeco, Whittier, California, Elsevier Inc., 2009, 20 pages.

Milanovic et al., "Compact MEMS Mirror Based Q-Switch Module for Pulse-on-demand Laser Range Finders," presented at SPIE Conference on MOEMS and Miniaturized Systems XIV, San Francisco, California, 2015, 7 pages.

Schiappelli et al., "Efficient fiber-to-waveguide coupling by a lens on the end of the optical fiber fabricated by focused ion beam milling," *Microelectronic Engineering*, 73-74, 2004, pp. 397-404.

Tsai et al., "A Laminate Cantilever Waveguide Optical Switch," 2012, downloaded Sep. 19, 2021 from IEEE Xplore, pp. 203-207.

Worhoff et al., "Flip-chip assembly for photonic circuits," MESA+ Research Institute, University of Twente, Integrated Optical MicroSystems Group, The Netherlands, 12 pages.

Invitation to Pay Additional Fees dated Oct. 17, 2022, PCT/US2022/036299, 10 pages.

International Search Report and Written Opinion dated Dec. 8, 2022, PCT/US2022/036299, 17 pages.

U.S. Appl. No. 17/750,082, filed May 20, 2022, Witmer et al.

U.S. Appl. No. 17/859,813, filed Jul. 7, 2022, Arbore.

* cited by examiner

LIGHT SOURCE MODULES FOR NOISE MITIGATION

CROSS-REFERENCE TO RELATED APPLICATIONS

This application claims the benefit under 35 U.S.C. § 119(e) of U.S. Provisional Patent Application No. 63/219,483, filed Jul. 8, 2021, the contents of which are incorporated herein by reference in their entirety.

FIELD

This disclosure relates generally to optical measurement systems with a light source module. More particularly, this disclosure relates to a light source module including multiple light sources that provide coherent noise mitigation for spectroscopic measurements.

BACKGROUND

Generally, coherent noise is a noise source in various types of imaging systems and may cause unwanted modifications of a signal. Coherent noise may degrade images in optical systems designed to measure spectroscopic information of a sample. Coherent noise may cause graininess, granular patterns, or intensity patterns in the measured signal or image. In some examples, this type of noise may significantly interfere with the information content of an optical signal. Some known systems may produce signals with so much coherent noise that it may be difficult to determine spectroscopic information in a corresponding measured signal. Thus, an optical measurement system that can mitigate coherent noise may be desired.

SUMMARY

Embodiments of the systems, devices, methods, and apparatuses described in the present disclosure are directed optical measurement systems and light source modules for use in these systems. Also described are systems, devices, methods, and apparatuses directed to providing de-cohered light that is spectroscopically equivalent with respect to a given measurement. The optical system may include multiple light sources that provide de-cohered light via phase shifts, different wavelengths, and so forth. The light source module may output one or more wavelengths of light, and may provide functionality to address issues relating to redundancy, increased power to effectively reduce detector noise, and/or coherent noise mitigation.

In some examples, the present disclosure describes a method of that may include emitting a first light output having a first wavelength, emitting a second light output having a second wavelength, and combining the first light output and the second light output into a combined light output having the first wavelength and the second wavelength. The method may further include receiving a portion of the combined light output at an optical detector, the portion of the combined light output returned from the sample, and determining spectroscopic information for the sample from the portion of the combined light output. The first and second light outputs produce a coherent noise at the sample, the coherent noise having a coherent noise bandwidth, and the spectroscopic information has a spectroscopic information bandwidth. The first wavelength and the second wavelength are separated by an interstitial range that is less than the spectroscopic information bandwidth and that is greater than the coherent noise bandwidth.

In some of these variations, the first light output is infrared light and the second light output is infrared light. Additionally or alternatively, the interstitial range is less than four nanometers. In some variations, the interstitial range is between one and four nanometers. In some instances, the first light output is emitted from a light emitter, the operation of determining spectroscopic information for the sample is performed by a processing unit, and the light emitter, the optical detector, and the processing unit are all within a housing. The coherent noise bandwidth may include a range of wavelengths within which two or more spectroscopic measurements of the sample have an r value that is greater than 0.5. In some of these coherent noise bandwidth is approximately one nanometer.

Other embodiments described here include a light source module having a first semiconductor light source operative to emit a first wavelength of light and a second semiconductor light source operative to emit a second wavelength of light that is different than the first wavelength of light. The light source module also includes a first optical junction operative to provide a first light output that includes the first and second wavelengths of light, a second optical junction operative to provide a second light output that includes the first and second wavelengths of light, and a multiplexer operative to provide a combined light output, such that the first wavelength of light provides a first coherent noise view and the second wavelength of light provides a second coherent noise view, thereby mitigating coherent noise.

In some of these variations, the first and second optical junctions are wavelength dependent multiplexers, each of the first and second wavelengths of light are within four nanometers of each other such that each of the first and second wavelengths of light are spectroscopically equivalent to one another. The light sources may act as redundant semiconductor light sources, and may be used together to provide increased power. Additionally or alternatively, each of the first and second wavelengths of light are spaced apart so that each wavelength of light provides a different coherent noise view, thereby mitigating coherent noise. In some instances, the first optical junction is a first Mach-Zehnder interferometer, and the second optical junction is a second Mach-Zehnder interferometer. In some instances, the first optical junction is operative to select one of the first or second wavelengths of light to output first output light, and the second optical junction is operative to select one of third or fourth wavelengths of light to output second output light. Each of the first and second wavelengths of light may spectroscopically equivalent to each other.

Still other embodiments described herein include a light source module having a first set of semiconductor light sources operative to emit a first set of wavelengths of light and a second set of semiconductor light sources operative to emit a second set of wavelengths of light. The light source module also includes a first wavelength independent coupler operative to output a first combined output derived from the first and second sets of wavelengths of light, and a second combined output derived from the first and second sets of wavelengths of light. The light source module further includes a second wavelength independent coupler operative to output a third combined output derived from the first and second sets of wavelengths of light and a fourth combined output derived from the first and second sets of wavelengths of light.

A first multiplexer is operative to receive the first combined output, receive the second combined output, output a first half of the first combined output, and output a first half of the second combined output. A second multiplexer is operative to receive the first combined output, receive the second combined output, output a second half of the first combined output, and output a second half of the second combined output. The first, second, third, and fourth combined outputs may be derived from different combinations of the first and second sets of wavelengths of light, the first set of wavelengths of light may provide a first set of coherent noise views, the second set of wavelengths of light may provide a second set of coherent noise views, and the first and second sets of coherent noise views mitigate coherent noise.

In some of these variations, the light source module includes a first waveguide coupled between the first wavelength independent coupler and the first multiplexer and a second waveguide coupled between the first wavelength independent coupler and the second multiplexer. The light source module further includes a third waveguide coupled between the second wavelength independent coupler and the first multiplexer, and a fourth waveguide coupled between the second wavelength independent coupler and the second multiplexer. In some instances, at least two waveguides of the first, second, third, and fourth waveguides cross paths with one another. Additionally or alternatively, each of the first and second sets of wavelengths of light are within four nanometers of each other and are spectroscopically equivalent, and each of the first and second sets of wavelengths of light is each greater than one nanometer apart from a closest wavelength of light to provide coherent noise mitigation.

In other variations, the first half of the first combined output is transmitted to a first launch region, and the second half of the first combined output by the second multiplexer is transmitted to a second launch region. Additionally or alternatively, the light source module may include a first waveguide coupled between the first wavelength independent coupler and the first multiplexer, a second waveguide coupled between the first wavelength independent coupler and the second multiplexer, a third waveguide coupled between the second wavelength independent coupler and the first multiplexer, and a fourth waveguide coupled between the second wavelength independent coupler and the second multiplexer, wherein none of the first, second, third, and fourth waveguides crosses paths with one another. In some variations, the first and second multiplexers are Echelle gratings. Each of the first and second sets of wavelengths of light may be spectroscopically equivalent to one another. In some variations, the first wavelength independent coupler is a two by two multimode interferometer, and the second wavelength independent coupler is a two by two multimode interferometer.

Still other embodiments are direct to methods for performing a spectroscopic measurement of a sample. These methods may include performing a set of measurements to generate multiple sets of measured signals and generating spectroscopic information using the multiple sets of measured signals. The set of measurements may include a first series of measurements and each measurement of the first series of measurements has a corresponding pair of spectroscopically equivalent wavelengths. Each measurement of the first series of measurements includes emitting light at the corresponding pair of spectroscopically equivalent wavelengths to the sample, and measuring light returned from the sample to generate a set of measured signals of the multiple sets of measured signals.

In some instances, emitting light at the corresponding pair of spectroscopically equivalent wavelengths includes simultaneously generating light of a first wavelength of the corresponding pair of spectroscopically equivalent wavelengths using a first light source and generating light of a second wavelength of the corresponding pair of spectroscopically equivalent wavelengths using a second light source. Additionally or alternatively, the set of measurements includes a second series of measurements, each of which includes emitting light at the corresponding wavelength to the sample and measuring light returned from the sample to generate a set of measured signals of the multiple sets of measured signals. In some of these variations, at least one measurement in the first series of measurements is performed simultaneously with at least one measurement in the second series of measurements.

In other instances, the method includes determining whether a first light source configured to generate a first wavelength meets a first set of operating criteria, and determining whether a second light source configured to generate a second wavelength meets a second set of operating criteria. The method may include performing, in response to determining that both the first light source meets the first set of operating criteria, and the second light source meets the second set of operating criteria, a measurement of the first series of measurements using the first wavelength and the second wavelength as the corresponding pair of spectroscopically equivalent wavelengths. The method may include performing, in response to determining that the first light source meets the first set of operating criteria and the second light source does not meet the second set of operating criteria, a measurement of the second series of measurement using the first wavelength as the corresponding wavelength. In some variations, the corresponding pair of spectroscopically equivalent wavelengths for each measurement of the first series of measurement provides different coherent noise views.

Other embodiments described herein are directed to a light source module having a plurality of pairs of light sources that collectively form a set of paired light sources having a first light source subset and a second light source subset, wherein each of the plurality of pairs of light sources includes a first light source configured to output light at a corresponding first wavelength, the first light source being part of the first light source subset, and a second light source configured to output light at a corresponding second wavelength separated by less than a target separation amount, the second light source being part of the second light source subset. The light source module further includes a first multiplexer optically connected to the first light source subset and configured to multiplex light received from the first light source subset, a second multiplexer optically connected to the first light source subset and configured to multiplex light received from the second light source subset, and a multiplexing unit configured to optically connect an output of the first multiplexer and an output of the second multiplexer to the set of outputs.

In some instances, the target separation amount may be 5 nanometers. Additionally or alternatively, the corresponding first wavelength and the corresponding second wavelength for each of the plurality of pairs of light sources are separated by at least 1 nanometer. In some variations, the light source module further includes a set of additional light sources and a third multiplexer optically connected to the set of additional light sources and configured to multiplex light received from the second light source subset, such that the multiplexing unit is configured to optically connect an output of the third multiplexer to the set of outputs. In some of these variations, each of the additional light sources is configured to output a corresponding wavelength that is separated from each the corresponding first and second wavelengths of each of the plurality of pairs of light sources by at least the target separation amount.

Another embodiment described herein includes an optical measurement system that includes a controller and a light source module having a set of outputs. The light source module may include a plurality of sets of light sources including a first set of light sources and a second set of light sources, a plurality of wavelength-specific multiplexers, each of which has an output and is configured to multiplex a corresponding set of light sources of the plurality of sets of light sources, and a multiplexing unit configured to route the outputs of the plurality of wavelength-specific multiplexers to the set of outputs. The controller may be configured to simultaneously operate a first light source of the first set of light sources to generate light of a first wavelength and a second light source of the second set of light sources to generate light of a second wavelength separated from the first wavelength by less than a target separation amount. The multiplexing unit may configured to simultaneously output light of the first wavelength and light of the second wavelength to at least one of the set of outputs.

In some of these variations, the target separation amount is 5 nanometers. The multiplexing unit may include a cascaded network of optical couplers. Additionally or alternatively, the multiplexing unit may include a first star coupler. In some of these variations, the multiplexing unit includes a second star coupler and a first controllable switch optically coupled to a first wavelength-specific multiplexer of the plurality of wavelength-specific multiplexers, wherein the first controllable switch may selectively route light to the first and second star couplers. In some variations, the light source module further comprises a wavelength locking unit. In some of these variations, each of the plurality of wavelength-specific multiplexers is optically connected to a controllable switch, and the wavelength locking unit is optically connected to the controllable switch.

In addition to the example aspects and embodiments described above, further aspects and embodiments will become apparent by reference to the drawings and by study of the following description.

BRIEF DESCRIPTION OF THE DRAWINGS

The use of the same or similar reference numerals in different figures indicates similar, related, or identical items.

Figure 1:
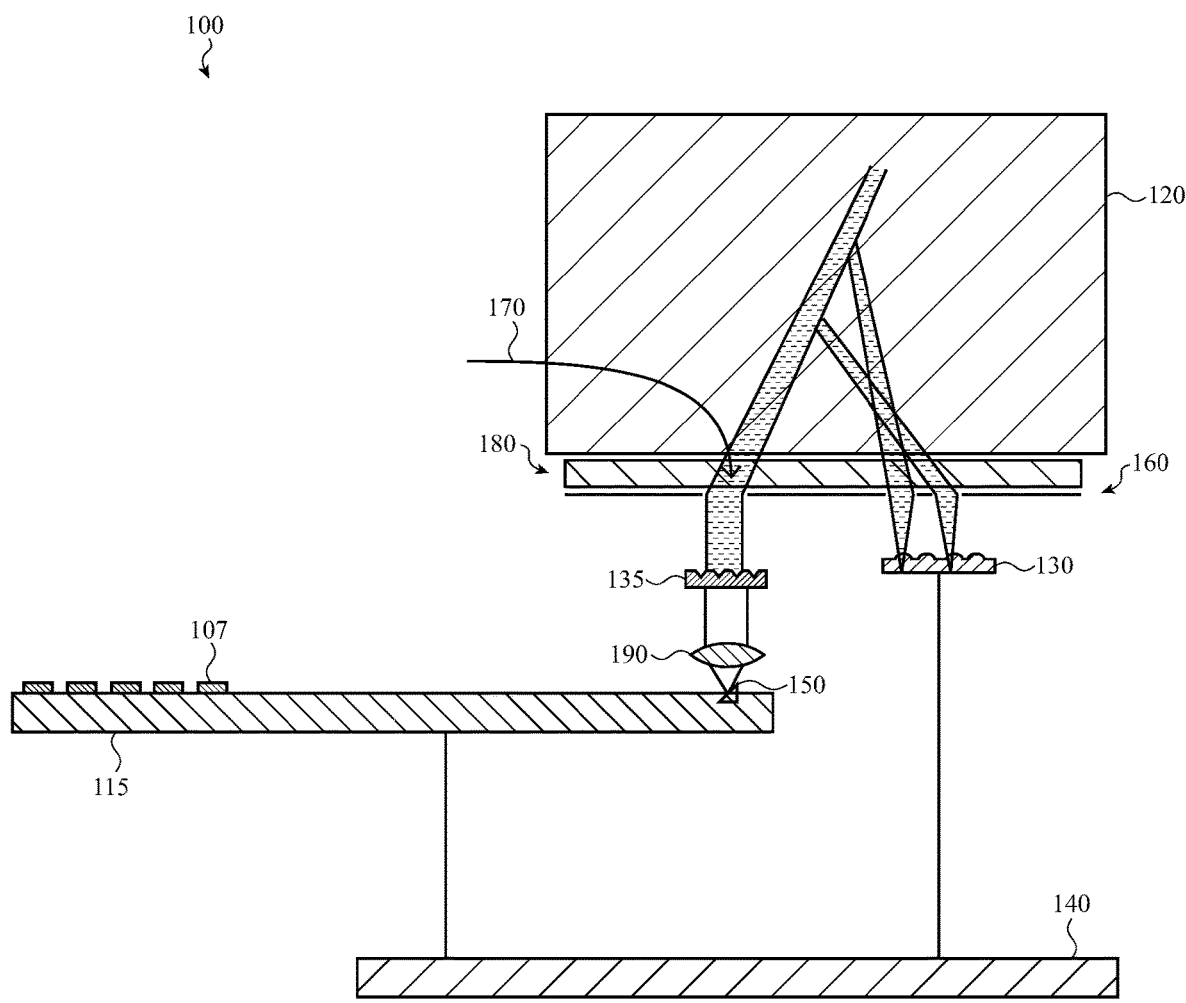
FIG. 1 shows a side view of one example of an optical measurement system as described herein.

Additionally, it should be understood that the proportions and dimensions (either relative or absolute) of the various features and elements (and collections and groupings thereof) and the boundaries, separations, and positional relationships presented between them, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to any single embodiment. To the contrary, it is intended to cover alternatives, modifications, and equivalents as can be included within the spirit and scope of the described embodiments as defined by the appended claims. Likewise, although multiple embodiments are described with certain terminology, elements, and structures, it should be appreciated that any embodiment disclosed herein may incorporate terminology, elements, and/or structures disclosed with respect to other embodiments.

The following disclosure relates to embodiments of optical measurement systems, light source modules that may be used with these optical measurement systems, and methods of performing measurements using these optical measurement systems. The optical measurement system may perform a spectroscopic measurement using light (e.g., coherent or semi-coherent light) of a plurality of different wavelengths, in which the optical measurement system generates and emits the light from the optical measurement system, and measures light received by the optical measurement system. The light measured by the optical measurement system may be analyzed to determine one or more properties of the environment surrounding the optical measurement system (e.g., the presence, type, and/or one or more characteristics of an object measured by the optical measurement system), collectively referred to herein as "spectroscopic information".

As used herein, a "sample" refers to any object or substance positioned to receive light emitted from the optical measurement system and return at least a portion of the light to the optical measurement system. When an optical measurement system as described herein is used to perform a spectroscopic measurement of a sample, coherent noise may limit the accuracy of the spectroscopic measurement. Accordingly, the optical measurement systems described herein may be configured to reduce coherent noise in spectroscopic measurements of a sample. As used herein, "coherent noise" is an optical noise resulting from coherent interference within a sample and that interferes with spectroscopic information being measured by the optical measurement system.

To help mitigate coherent noise, the optical measurement systems described herein may be configured to generate one or more groups of wavelengths, and may simultaneously emit light at a given group of wavelengths. The wavelengths within a given group may be selected to be nearly identical, but separated by a certain amount. If the wavelengths of a given group are properly spaced, they may be treated as a single wavelength for the purpose of determining spectroscopic information in a spectroscopic measurement, yet also reduces the coherent noise for the spectroscopic measurement.

Also described herein are light source modules that include light sources configured to generate these one or more groups of wavelengths. The light source modules may be configured to route light from these light sources to one or more outputs. Each output may provide light generated from the light source module to a corresponding launch site of the optical measurement system. Light may be emitted from the optical measurement system from one or more launch sites, and each launch site provides a unique entry position and/or angle to a sample.

When the optical measurement systems described herein are used to perform a spectroscopic measurement, the optical measurement system illuminates the sample with different wavelengths of light within a target spectrum and measures the sample's response to these wavelengths. Depending on the application, an optical measurement system does not necessarily need to measure the sample's response (e.g., the measured spectroscopic information) to the entire target spectrum but instead may measure spectroscopic information using a discrete number or set of wavelengths within the target spectrum. This may simplify the design of the optical measurement system by allowing it to incorporate individual light sources that provide light outputs at these discrete wavelengths, rather than utilizing light sources providing light outputs across all wavelengths of the target spectrum.

Accordingly, in some embodiments, the optical measurement systems include a plurality of light sources that can be utilized to emit light at different wavelengths to reduce coherent noise. The optical measurement systems may employ coherent light sources, such as lasers, that output light (e.g., provide "light output") having relatively narrow wavelength ranges. A given light source may be single-frequency (fixed wavelength) or may be tunable to selectively generate one of multiple wavelengths (i.e., the light source may be controlled to output different wavelengths at different times). A laser may include a semiconductor laser, such as a laser diode (e.g., a distributed Bragg reflector laser, a distributed feedback laser, an external cavity laser), a quantum cascade laser, or the like.

As used herein, a "bandwidth" refers to a range of wavelengths (which in some instances may be a single wavelength) associated with a given component or operation. For example, the optical measurement system may perform a spectroscopic measurement using a measurement bandwidth, which represents the portion of the spectrum (i.e., the target spectrum) that encompasses the plurality of wavelengths used to perform the spectroscopic measurement. Similarly, light emitted by a light source may have a bandwidth, which represents the wavelength or wavelengths of the emitted light. When a value of a wavelength (or wavelengths) is discussed herein, this value may be a time-averaged wavelength value, or an instantaneous wavelength value. Additionally, while the term "bandwidth" is used herein to describe wavelengths, it should be understood that the principles discussed herein apply equally to embodiments where "bandwidth" refers to frequencies, insofar as an equivalent frequency exists for any given wavelength.

The coherent noise associated with a measurement is dependent on the wavelength of light used to perform that measurement. If two measurements are performed using different wavelengths, the coherent noise from each measurement (also referred to herein as a "coherent noise view") may be correlated with each other by an amount that depends on how close the wavelengths are to each other. If two wavelengths are sufficiently close to each other, measurements performed using these wavelengths will effectively have the same coherent noise. Conversely, if wavelengths are sufficiently separated, measurements performed using these wavelengths can be treated as having different coherent noise sources.

As used herein, the "coherent noise bandwidth" for a target wavelength refers to a range of wavelengths around the target wavelength for which otherwise identical measurements taken at different wavelengths result in highly correlated coherent noise. In other words, if an optical measurement system were configured to take a first measurement while emitting light at a first wavelength in a coherent noise bandwidth, then to take a second measurement while emitting light at a second wavelength in the coherent noise bandwidth, then the first and second measurements would have highly correlated coherent noise. In these instances, the first wavelength would be considered to be within the coherent noise bandwidth of the second wavelength, and vice versa. Similarly, both the first and second wavelengths may both be within the coherent noise bandwidth of an additional wavelength (or wavelengths).

What qualifies as "highly correlated" is largely dependent on the accuracy constraints for a given system design and intended sample characteristics, but for the purposes of this application, two signals (e.g., signals representing the coherent noise of a measurement, spectroscopic measurements of a sample) are highly correlated if they have a correlation coefficient r that is greater than 0.5. It should be appreciated however, that some systems may be designed with a more stringent correlation requirement (e.g., r greater than 0.7 or r greater than 0.8), and may apply different correlation requirements when comparing different types of signals.

Depending on what spectroscopic information is being measured by the optical measurement system, the signal-to-noise ratio ("SNR") for individual measurements at different wavelengths can be limited by different noise sources, such as a fundamental noise source or a coherent noise source. When a measurement at a given wavelength is limited by fundamental noise, the SNR may be increased by increasing the amount of light introduced into the sample for this wavelength. When a measurement at a given wavelength is limited by coherent noise, the SNR will not be improved by increasing the amount of light introduced into the sample at this wavelength. In these instances, an optical measurement system would need to utilize other techniques to improve SNR at these wavelengths.

Accordingly, the optical measurement systems described herein may be configured to emit light at multiple wavelengths that are treated as a single wavelength for the purpose of calculating spectroscopic information. Depending on the design of the optical measurement system, as well as the sample and spectroscopic information being measured, the optical measurement system can tolerate some wavelength deviations from a given target wavelength of the plurality of wavelengths and still obtain a spectroscopic measurement that is effectively the same as if it were taken using the target wavelength. Two or more wavelengths are "spectroscopically equivalent" for a given sample if otherwise identical measurements taken at these wavelengths have highly correlated signal values. In some embodiments, measurements taken at spectroscopically equivalent wavelengths may be averaged together and any coherent noise may become a zero mean; that is, the signals may converge and so result in an averaged measured signal with less coherent noise.

For a given sample, there may be a range of wavelengths around a target wavelength that are spectroscopically equivalent (referred to herein as the "spectroscopic information bandwidth"), where the range is wider than the coherent noise bandwidth for the target wavelength. The optical measurement systems may be configured to take a measurement using a group of wavelengths that are spectroscopically equivalent, but produce different coherent noise views. Specifically, two wavelengths produce different coherent noise views if one of the wavelengths is positioned outside the coherent noise bandwidth of the other wavelength. In other words, the wavelengths are separated by an interstitial wavelength range that allows for the generation of different coherent noise views while still allowing the optical measurement systems to use measured light from these wavelengths interchangeably. Thus, two different wavelengths of light may be used to measure properties of a sample; these wavelengths may be spectroscopically equivalent but provide different noise (e.g., have different noise profiles). Information from these wavelengths may be used to reduce coherent noise without meaningfully impacting or compromising spectroscopic measurements or the associated spectroscopic information calculated therefrom.

In this manner, although the wavelengths of the light emitted by the optical measurement system are different from one another, they are close enough to be spectroscopically equivalent with respect to the optical measurement system's measurement capabilities. Put another way, the same sample attribute may be measured with different wavelengths of light.

Because the spectroscopic information bandwidths for various wavelengths are dependent on the type of sample, the optical measurement systems described herein may be designed to take measurements of a particular type or types of sample (a "target sample type"). Accordingly, the overall range of wavelengths that are emitted by an optical measurement system (e.g., the measurement bandwidth), as well as the selection of any individual wavelengths within this range, may be selected based on the target sample type and the spectroscopic information that will be measured. Additionally, when a group of spectroscopically identical wavelengths that provide different coherent noise views are treated by the optical measurement system as a single target wavelength, the selection of wavelengths with each group may be based on the overall design of the optical measurement system as well as the target sample type and spectroscopic information that will be measured.

For example, in some embodiments, the target sample type is human skin, and the optical measurement system may derive physiological information about a user using a spectroscopic measurement. Other embodiments may measure attributes (e.g., the presence or amount of a chemical compound or other component) of different target sample types, which may include gas (e.g., for environmental sensing), food (e.g., for determining nutritional content), other objects, or the like. Where the sample is human skin, the spectroscopic information bandwidth (which may depend on the wavelength of emitted light) may be on the order of three to four nanometers for many target wavelengths (such as certain wavelengths in the infrared spectrum). At these target wavelengths, the coherent noise bandwidth may be on the order of a nanometer or less. Accordingly, in some instances where an optical measurement system is configured to measure skin, a group of wavelengths may be selected so that they are within four nanometers of each other (and thus may be spectroscopically equivalent), yet are separated by an interstitial range of at least one nanometer to thereby provide different coherent noise views.

Because the coherent noise bandwidth and the spectroscopic information bandwidth may change with the composition of the sample and the design of the optical measurement system, different types of samples may necessitate a different selection of wavelengths. In some instances, this may entail the use of different systems to measure different types of samples. In other instances, an optical measurement system may include enough light sources to generate the wavelengths necessary to perform measurements of multiple different target sample types. When the optical measurement system is used to measure a first type of sample, a first set of light sources may be selected and used to perform a spectroscopic measurement. When the optical measurement system is used to measure a second type of sample, a different second set of light sources may be selected and used to perform a spectroscopic measurement.

While changing the wavelength of the light emitted by the optical measurement system may provide different coherent noise views, this is just one way in which the optical measurement systems described here may mitigate coherent noise. For example, the coherent noise experienced by light in a spectroscopic measurement may vary based on the path the light takes through the sample, and thus may vary with a number of factors, such as the angle at which light enters the sample, scattering properties of the sample, the width of the light output, physical geometry of illumination and collection elements in an optical measurement system, and so forth. As a result, the optical measurement systems may be configured to measure light that has passed through a wider volume of the sample, which may provide a range of different coherent noise views. Changing the wavelength of the light as discussed above may be used to provide a different coherent noise view for a given region of the sample. This may also allow coherent noise to be reduced without exacerbating other noise sources in the optical measurement system, such as detector noise and laser noise.

Generally, the optical measurement systems and methods described herein utilize a light source module to generate light used for spectroscopic measurements. Specifically, the light source modules described herein include multiple light sources that are integrated into a single module. In some instances, the light source module may be part of a photonic integrated circuit. Light generated by the light source module may be launched from the light source module or another portion of a photonic integrated circuit incorporating the light source module at one or more locations (e.g., via an outcoupler such as an edge coupler, a vertical output coupler, or the like). Light launched from the light source module may exit the optical measurement system (and any device incorporating the optical measurement system) at one or more launch sites toward a sample.

When an optical measurement system produces light at a group of wavelengths that provide different coherent noise views but are spectroscopically equivalent, a light source module of the optical measurement system may include two or more light sources, each of which is configured to generate light at a corresponding wavelength of the group. These light sources may be run simultaneously, which effectively doubles the output power of the optical measurement system at a given wavelength in instances when the optical measurement system treats the group of wavelengths as a single wavelength for the purpose of calculating spectroscopic information. In other instances, only one of these light sources is run at a time. For example, this may provide redundancy to the optical measurement system in case one of the two light sources fails to operate as intended.

When the light source module is part of a photonic integrated circuit, the photonic integrated circuit may incorporate multiple components (e.g., a light source module, optical junction(s), and one or more multiplexers) in a single package. In one sample embodiment, light outputs from the light sources may be tuned by an optical junction (such as an interferometer or optical coupler as discussed below) which, in turn, transmits the light outputs to the multiplexer. The multiplexer outputs a single light output having a bandwidth that is less than a bandwidth of coherent noise from a sample, and in some instances can do so with approximately zero optical loss. As used herein, "zero optical loss" may be understood to be a condition in which no loss is associated with the operation of the light source module, or less than approximately two to three percent optical loss is associated with operation of the light source module. The light source module may include components that are wavelength dependent (where there is a wavelength dependency on transmission between an input or inputs and an output or outputs of the component) or wavelength independent (where light is transmitted between input(s) and output(s) of the component regardless of its wavelength) for the wavelengths of light produced by the light source module.

These and other embodiments are discussed below with reference to FIGS. 1-10. However, those skilled in the art will readily appreciate that the detailed description given herein with respect to these figures is for explanatory purposes only and should not be construed as limiting.

As used throughout this specification, a reference number without an alpha character following the reference number can refer to one or more of the corresponding references, the group of all references, or some of the references. For example, "207" can refer to any one of the light sources 207 (e.g., light source 207A1, light source 207B1, etc.), can refer to all of the light sources 207, or can refer to some of the light sources (e.g., both light source 207A2 and light source 207A1 in a light source set 210A) depending on the context in which it is used.

Representative applications of methods and apparatuses according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

FIG. 1 illustrates an optical measurement system 100, which may include an interface 180, a set of light sources 107, a detector 130, a controller 140, an outcoupler 150, a diffuser 135, a lens 190, and a substrate or photonics die 115. The set of light sources 107, outcoupler 150, and associated photonics elements (such as those discussed below with respect to FIGS. 2A-9, including optical couplers, multiplexers, and the like) are typically formed on or in the photonics die 115 to form a photonic integrated circuit. The photonic integrated circuit may be part of a larger optical system that forms the optical measurement system.

The interface 180 can include an external surface of a device that incorporates the optical measurement system 100 (and may form a portion of a housing of such a device). The interface 180 can accommodate light transmission therethrough, thereby allowing the optical measurement system to emit externally to a sample and receive light returned therefrom. The interface 180 includes at least one window that defines one or more emission regions (through which light emitted by the optical measurement system 100 may exit the device) and one or more collection regions (through which light entering the device may reach a predetermined portion of the optical measurement system 100, such as detector 130).

In some examples, the optical measurement system 100 can include an aperture structure 160 including one or more regions (e.g., a transparent region 170, an opaque region, a translucent region, a reflective region, a region having a different refractive index than surrounding material, and so on) that define the emission and/or collection regions of the interface 180. The aperture structure 160 may direct and/or control the launch position (or positions) of the light into the sample 120 being measured by the optical measurement system 100. By controlling the location and/or angles of light entering the sample 120, the light incident on the sample 120, and/or exiting from the sample 120, can be selectively configured. Although depicted in FIG. 1, the sample 120 is not included in the optical measurement system 100.

While operating the optical measurement system 100, the sample 120 can be located close to, or touching at least a portion of, the optical measurement system 100, such as the interface 180. The set of light sources 107 can be coupled to the controller 140, which may include one or more processing units and control operation of each light source of the set of light sources 107. For example, the controller 140 can send a signal (e.g., current or voltage waveform) to control a given light source 107, which can thereby generate light. As mentioned above, the set of light sources 107 may collectively be able to generate light of a plurality of different wavelengths, which may be directed to the sample 120 via the interface 180. Different wavelengths may be emitted sequentially, allowing a series of individual measurements to be performed at different wavelengths. These individual measurements may be performed with different durations depending on the wavelength. These individual measurements may collectively form a spectroscopic measurement as described herein.

As mentioned above, the set of light sources 107 may include one or more groups of light sources, where each group of light sources generates light at a corresponding group of wavelengths that are spectroscopically equivalent but provide different noise views. In instances where a spectroscopic measurement includes a series of individual measurements taken using different wavelengths, multiple light sources of one of these groups of light sources may be operated simultaneously during an individual measurement, and the optical measurement system 100 may consider this individual measurement to have been performed at a single wavelength for the purpose of calculating spectroscopic information.

Generally, the photonic integrated circuit may be configured such that light generated by each light source used in a given spectroscopic measurement can exit the optical measurement system from the same location (or set of locations). In this way, the individual measurements performed at different wavelengths may be introduced to a common portion of the sample 120. Accordingly, in some instances the light outputs from the light sources 107 may be combined into a single combined light output or a set of combined light outputs from the photonics die 115 (even if only a single wavelength may be emitted at a given time). Each combined light output may be collimated, focused, diffused, or otherwise acted upon by optical elements such as the lens 190 before it reaches the sample 120. Similarly, light returned from the sample may be collimated, focused, diffused, or otherwise acted upon by optical elements before reaching the detector 130.

In instances where multiple light sources are generating light simultaneously, the combined light output may contain the light output generated by each of these light sources 107, and the wavelengths of those light outputs generally remain unchanged. Certain embodiments may use or incorporate light sources 107 that output infrared light. "Infrared," as used herein, refers to wavelengths of light that are longer than visible light and generally have wavelength greater than 800 nanometers. The light sources 107 in these instances may be configured to emit any suitable infrared wavelengths, such as wavelengths in the short-wavelength infrared spectrum and/or the mid-wavelength infrared spectrum. As discussed above, the range of wavelengths that may be spectroscopically useful for a given measurement may depend at least in part on the type of sample 120 as well as the spectroscopic information being measured.

Discussions herein may reference an optical measurement system 100, a light source module, a photonics die(s) 115, and/or a photonic integrated circuit as emitting light, though this light actually may initially be generated by one or more of the light sources 107. As such, discussions of a given component emitting light is considered to encompass the underlying light source or sources that are generating the light, so long as that light source or light source set is part of that component.

In some examples, the set of light sources 107 may generate light that is manipulated by one or more elements within the photonics die 115 and ultimately exits the photonics die 115 via an outcoupler 150. When the photonics die 115 emits light in this manner, the light may be modified by one or more optical components before reaching the sample 120, as discussed above. For example, in the variation shown in FIG. 1 this light output may be received by a lens 190. The lens 190 may be a free space lens or include other free space optics; in some examples, the lens 190 instead may be multiple lenses that cooperate or coordinate to focus a light output from the outcoupler 150. Additionally, the lens 190 may perform multiple functions, such as collimating light, beam steering, and/or beam shaping a light output from the photonics die 115.

In the embodiment shown in FIG. 1, the light output from the lens 190 may be directed to a diffusing element 135. The diffusing element 135 may move in one or multiple dimensions and the movement of the diffusing element 135 may be discrete or continuous. The diffusing element 135 may generate an illumination profile of light that is based at least partially on the angle spacing of light received from the lens 190 and the total range of angles of light incident on the diffuser.

Depending on the nature of the measured sample 120, light can penetrate into the sample 120 to reach one or more scattering sites and can return (e.g., reflect and/or scatter back) towards the optical measurement system 100. Depending on the design of the optical measurement system 100 and the nature of the sample 120, light may travel within the sample 120 according to a controlled path length distribution (i.e., a range of path lengths that a certain wavelength of light emitted from the optical measurement system is expected to travel before returning to the optical measurement system 100). The return light that enters back into the optical measurement system 100 may be directed, collimated, focused, and/or magnified. The return light can be directed towards the detector 130. The detector 130 can detect the return light and can send an electrical signal indicative of the amount of detected light to the controller 140. This measured signal contains, and may be used with, measured signals from other measurements to calculate spectroscopic information related to the properties of the sample 120.

In some instances, some of the light emitted by the photonics die 115 (and generated by one or more light sources 107) can optionally be directed towards a reference (not illustrated in FIG. 1). The reference can redirect light towards optics which may include, but are not limited to, a mirror, lens, and/or a filter, and may direct, collimate, focus, and/or magnify light towards the detector 130. The detector 130 can measure light reflected from the reference and can generate an electrical signal indicative of this reflected light for calibration of the optical measurement system 100 or other quality purposes.

The controller 140 can be configured to receive one or more electrical signals from the detector 130; these electrical signals may be used (e.g., by controller 140 or another processor) to calculate spectroscopic information about the sample 120. For example, the detector 130 may be configured to transmit the electrical signals to the controller 140, which calculates spectroscopic information therefrom. In some instances, the detector may include a detector array with multiple sensing elements (e.g., an array of photodiodes), and the detector 130 may output a different electrical signal for each sensing element. Each sensing element of the detector array may collect light from a different location or region of the sample 120, or, in instances where the optical measurement system 100 includes a reference, light returned from the reference. In some instances, a given sensing element of the detector 130 may receive light from different locations at different times and may output a time-multiplexed signal corresponding to these locations. For example, a sensing element may alternate between measuring light received from the sample 120 and light received by a reference.

As mentioned above, embodiments of the optical measurement systems described herein may be incorporated into a device (e.g., which may have a housing that includes the interface 180). The device, which in some instances is configured to be wearable by a user, may operate solely to take measurements using the optical measurement system or may be a multi-functional device capable of performing additional functions (not discussed in detail herein). For example, in some instances the optical measurement system may be incorporated into a smart phone, tablet computing device, laptop or desktop computer, a smartwatch, or other electronic device (collectively referred to herein as "electronic devices" for ease of discussion).

FIGS. 2A-9 show different embodiments of light source modules that may be used to route light from a plurality of light sources to a corresponding set of outputs. The light source modules may be incorporated into a photonic integrated circuit (e.g., the photonic integrated circuit including the light sources 107 and photonics die 115 of the optical measurement system 100 of FIG. 1), and light received at these outputs may be emitted from the photonic integrated circuit, such as via an outcoupler. Accordingly, light from each output of light source module may be used to provide light to one or more launch sites of the optical measurement system.

Figure 2A:
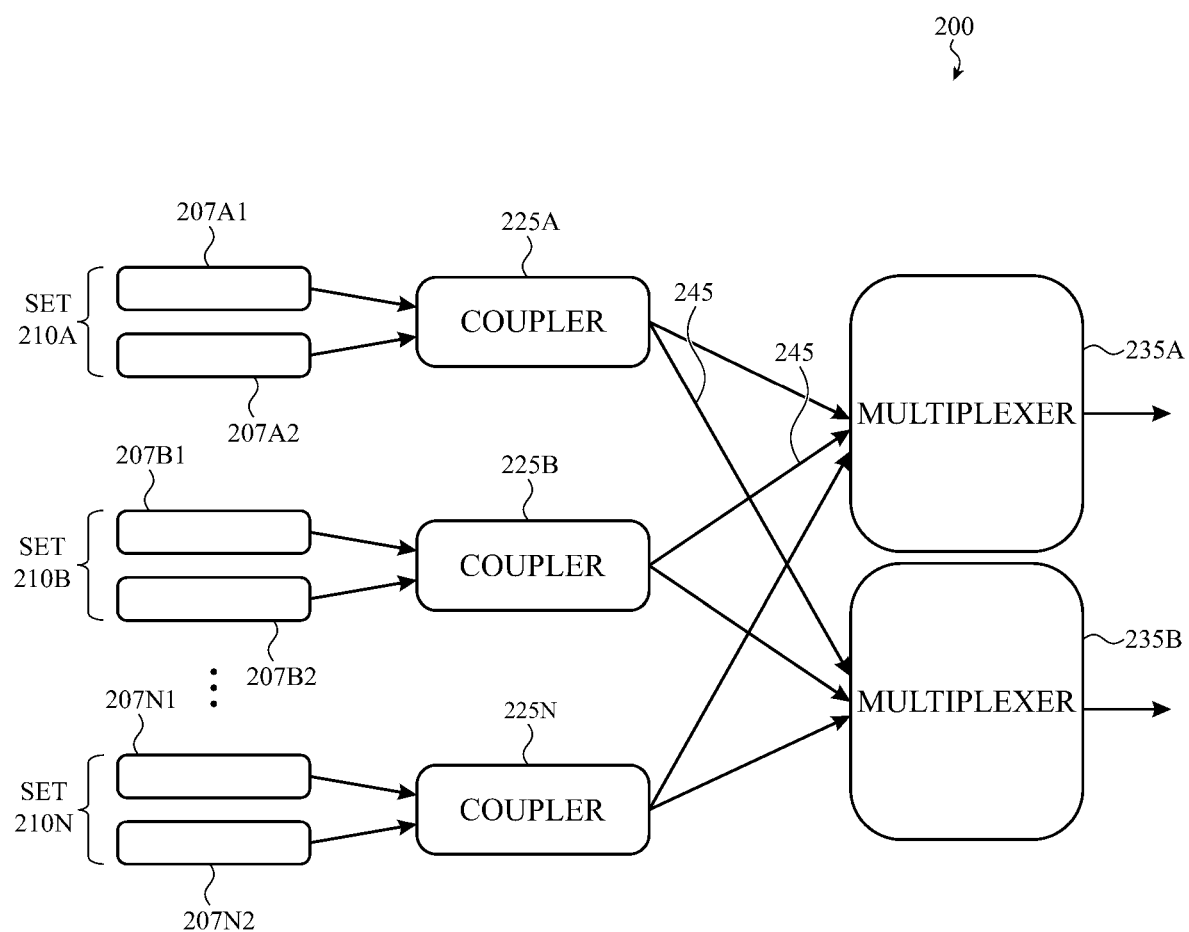
FIGS. 2A and 2B illustrate schematic diagrams of example light source modules that utilize a set of optical couplers to combine light generated by corresponding light source sets.

FIG. 2A illustrates an example light source module 200. The light source module 200 may include multiple light source sets 210 of light sources 207, a set of optical couplers 225, and a set of multiplexers 235. As shown there, each light source set 210 is optically connected to (i.e., coupled in manner that allows light transmission to) each of the set of multiplexers 235 via an optical coupler 225, such that each multiplexer 235 receives a portion of the light generated by each light source 207. As a result, each multiplexer 235 is optically connected to every light source 207, and may output light it receives from any of the light sources 207 that are active at a given time. The output of the multiplexers 235 may form the outputs of the light source module 200.

Individual elements of a group depicted in FIG. 2A, such as the light sources 207, may be referred to with a separate element number 207A1, 207A2, 207B1, 207B2, and so forth. For example, FIG. 2A depicts three light source sets 210 (a first light source set 210A, a second light source set 210B, and a third light source set 210N), each of which including two light sources 207 (the first light source set 210A has first and second light sources 207A1, 207A2, the second light source set 210B has first and second light sources 207B1, 207B2, and the third light source set 210N has first and second light sources 207N1, 207N2). The set of optical couplers 225 is shown as having three optical couplers 225 (first optical coupler 225A, second optical coupler 225B, and third optical coupler 225N). Finally, the set of multiplexers 235 includes a first multiplexer 235A and a second multiplexer 235B. The operation of the light source module 200 is described using the first light source set 210A and the first optical coupler 225A, though it should be appreciated that these principles may be applied to the other light source sets 210 and their corresponding optical couplers 225. Indeed, the light source module 200 may include any suitable number of light source sets 210 and corresponding optical couplers 225 as may be desired.

Generally, the light sources 207 of a given light source set 210 may be configured to generate light at wavelengths that are close to each other. For example, the light sources 207A1 and 207A2 of the first light source set 210A may emit light of the same wavelength or different wavelengths of light. In some examples, the light sources 207 emit the same wavelength of light. Because the light sources 207A1 and 207A2 are independently controllable and may be used individually or may be used at the same time, the light source module 200 may provide redundancy for the optical measurement system.

Some light sources may fall outside the specifications or may not be functioning as designed; in this case, redundancy of light sources may at least partially resolve these issues. For example, as long as one of the light sources 207A1 and 207A2 of the first light source set 210A is properly functioning, the first light source set 210A may still provide light to both multiplexers 235. In the event that one of the light sources, such as light source 207A1 should fail, then light source 207A2 may be used and vice versa. Conversely, if each of the light sources 207A1 and 207A2 are optically connected to a single multiplexer (e.g., light source 207A1 is optically connected only to the first multiplexer 235A and light source 207A2 is optically connected only to the second multiplexer 235B), failure of one of these light sources would result in the corresponding multiplexer 235 being unable to receive any light of that wavelength.

When the light sources 207A1 and 207A2 simultaneously emit light, this may allow for increased output power at each of the multiplexer 235 outputs. If the light sources 207A1 and 207A2 are capable of producing approximately the same optical power, generating light from both light sources simultaneously thus allows the output power of the light source module 200 to be approximately doubled for that wavelength (as compared to when only one of the light sources 207A1 and 207A2 is used). Thus, the light source module 200 may provide redundancy and/or increased power output per wavelength of light for any light source sets 210 that generate the same wavelength of light. Additionally, the light sources 207A1 and 207A2 may emit the same wavelength of light at approximately the same intensity, but need not (e.g., one light source 207 from a light source set 210 may be configured and/or controlled to generate a different intensity of light as compared to that of other light sources within that light source set 210).

In some examples, the light sources 207 from a light source set may be configured to generate light at different wavelengths. In some variations the light sources 207A1 and 207A2 of the first light source set 210A may emit light at wavelengths that are spectroscopically equivalent and/or produce different coherent noise views for spectroscopic measurements of a target sample type performed by an optical measurement system that incorporates the light source module 200. In some variations, the wavelengths generated by light sources 207A1 and 207A2 of the first light source set are separated by less than four nanometers (e.g., the wavelength of light generated by the light source 207A1 is less than four nanometers apart from the wavelength of a light output by the light source 207A2). In some of these variations, the wavelengths generated by light sources 207A1 and 207A2 of the first light source set are separated by less than four nanometer. This limited wavelength separation may cause the first light source set 210A to produce spectroscopically equivalent wavelengths for a given spectroscopic measurement performed by an optical measurement system as discussed previously.

Because the optical measurement system may treat light measured at these different wavelengths as a single wavelength for the purpose of calculating spectroscopic information, the light sources 207A1 and 207A2 may be operated independently to provide the redundancy and increased optical power described immediately above. Accordingly, as long as one of the light sources 207A1 and 207A2 of the first light source set 210A is properly functioning, the first light source set 210A may still provide light to both multiplexers 235 that may be usable by an optical measurement system to perform a spectroscopic measurement.

Additionally or alternatively, the wavelengths generated by light sources 207A1 and 207A2 of the first light source set 210A are separated by at least one nanometer (e.g., the wavelength of light generated by the light source 207A1 is at least one nanometer apart from the wavelength of a light output by the light source 207A2). For certain spectroscopic measurements performed by an optical measurement system, this wavelength separation may provide different coherent noise views from each light source 207 within a given light source set 210. This coherent noise may be averaged out to reduce the noise associated with the spectroscopic measurements.

In some instances, each light source set 210 is configured to produce a different wavelength or wavelengths. Indeed, while the light sources within a given light source set 210 may generate a single wavelength or multiple closely-spaced wavelengths as discussed above, the wavelength or wavelengths generated by one light source set may be separated from the wavelength or wavelengths generated by another light source set by a relatively large amount (e.g., spanning tens or hundreds of nanometers). For example, in some instances, any wavelength (or wavelengths) generated by the first light source set 210A is not spectroscopically equivalent to any wavelength (or wavelengths) generated by the second light source set 210B. This may allow the light source sets 210 to collectively emit light across a broad spectrum of wavelengths, which may thereby facilitate spectroscopic measurements using this broad spectrum of wavelengths.

As mentioned above, each light source set 210 is optically connected to a corresponding optical coupler 225. Each coupler 225 has two inputs and two outputs, where each input is optically connected to a corresponding light source 207 of the light source set 210 and each output is connected to a corresponding multiplexer 235 of the set of multiplexers. The optical coupler 225 splits a portion of the light received at each input between the outputs, thereby routing light generated from each light source 207 of a light source set 210 to both the first multiplexer 235A and the second multiplexer 235B.

For example, the first optical coupler 225A may receive light from the light source 207A1 on a first input of the first optical coupler 225A and may receive light from the light source 207A2 on a second input of the first optical coupler 225A. Similarly, the second optical coupler 225B may receive light from the second light source set 210B at its inputs and the third optical coupler 225N may receive light from the third light source set 210N. Similarly, each of the first, second, and third optical couplers 225A, 225B, and 225N may provide light to the multiplexers 235A and 235B. For example, a first output of the first optical coupler 225A is optically connected to the first multiplexer 235A and a second output of the second optical coupler 225 is connected to the second multiplexer 235B. The optical connections between the light sources 207 and the optical couplers 225, and between the optical couplers 225 and the multiplexers 235 are illustrated in FIG. 2A as light paths 245. In some examples, such as when the light source module 200 is incorporated into a photonic integrated circuit, the light paths 245 are waveguides.

Each optical coupler 225 may be any suitable optical coupler, such as a wavelength independent directional coupler, having two inputs and two outputs. Example optical couplers 225 include a Mach-Zehnder interferometer (MZI), or a multimode interferometer (MMI) (e.g., a 2×2 MMI), or the like. When light is received by an optical coupler 225 at an input thereof, the optical coupler 225 is configured to split this light between the outputs according to a predetermined splitting ratio. For example, each optical coupler 225 may be configured such that optical power received from each light source 207 (i.e., at a corresponding input of the optical coupler 225A) may be split to approximately equally each of the outputs. In these instances, when the light sources 207A1 and 207A2 of the first light source set 210 simultaneously generate light, the first output of the first optical coupler 225A (and thus the first multiplexer 235A) will receive half of the light generated by light source 207A1 and half of the light generated by light source 207A2. Similarly, the second output of the first optical coupler 225A (and thus the second multiplexer 235B) will receive the other half of the light generated by light source 207A1 and the other half of the light generated by light source 207A2.

In some instances, the set of optical couplers 225 may be replaced with a set of 2×2 controllable switches. An example controllable switch is described below with respect to FIG. 4, and may be controlled to selectively route light from either light source 207 of a light source set 210 to one or both of the set of multiplexers 235. Specifically, a first input of a controllable switch is optically connected to one light source 207 of a light source set 210 and the second input of the controllable switch is optically connected to the other light source 207 of the light source set 210. Similarly, a first output of the controllable switch is optically connected to the first multiplexer 235A and a second output of the controllable switch is connected to the second multiplexer 235B. In these instances, the controllable switch may be controlled to adjust how light received at a given light source is split between the multiplexer 235.

Each multiplexer 235 of the set of multiplexers 235 may be any multiplexer capable of combining multiple inputs corresponding to the multiple wavelengths received from the various light source sets into a set of outputs (though it should be appreciated that a multiplexer 235 may only receive light at a single input at a given point in time). In some examples, the multiplexers 235 may be wavelength-selective multiplexers such as an Echelle grating multiplexer, an arrayed waveguide grating (AWG) multiplexer, a ring resonator multiplexer, or the like. In instances where the couplers 225 are configured to equally split light between their outputs, each multiplexer 235 receives half the light generated by a given light source set 210. Accordingly, each multiplexer 235 can output half the light generated by that light source set 210 to be used elsewhere in the system. For example, an optical measurement system may output light to multiple regions of a sample (e.g., via different launch sites of the optical measurement system), and the first multiplexer 235A may output light to a first launch site (or set of launch sites) and the second multiplexer 235B may output light to a second site (or set of launch sites). In some instances, the output of a multiplexer 235 is split to provide additional outputs of the light source module 200.

The multiplexers 235 may be able to multiplex multiple different wavelengths of light from a given light source set with minimal optical losses. In some examples, the wavelength bandwidth of the multiplexer 235 (i.e., the range of wavelengths that may pass through a given input channel and still be routed to the output channel) may be less than approximately five to ten nanometers depending on the design of the multiplexer 235. Accordingly, if the wavelengths produced by a light source set are sufficiently close (such as the wavelengths separated by less than four nanometers discussed above) these different wavelengths may be introduced to the same input channel of the multiplexer 235 and be multiplexed with little optical loss. Conversely, it may be difficult to add a separate channel to a multiplexer 235 for each of these wavelengths without increasing the optical losses.

While two multiplexers 235 are shown in FIG. 2A, it should be appreciated that in some instances the light source module 200 includes more than two multiplexers 235. In these embodiments, the light source module 200 may include multiple optical couplers that optically connect a light source set 210 to the set of multiplexers. For example, in some instances, each output of the optical couplers 225 shown in FIG. 2A may be optically connected to a corresponding 1×2 optical coupler (not shown). Each output of the 1×2 couplers is optically connected to a respective multiplexer 235, thereby optically connecting a light source set 210 to four multiplexers. Similarly, a light source set may include more than two light sources 207 (e.g., three or four light sources), and additional optical couplers may be used to combine the light generated from these light sources and route them to the multiplexers 235.

The light sources within a given light source set 210 (e.g., the light sources 207A1 and 207A2 of the first light source set 210) may be formed on the same substrate or may be formed on different substrates. In instances where the light sources 207 of a light source set 210 are formed on the same substrate, they may be positioned immediately adjacent to each other (i.e., with no intervening light sources 207) or may be positioned with one or more light sources 207 (e.g., from a different light source set) positioned therebetween.

Figure 2B:
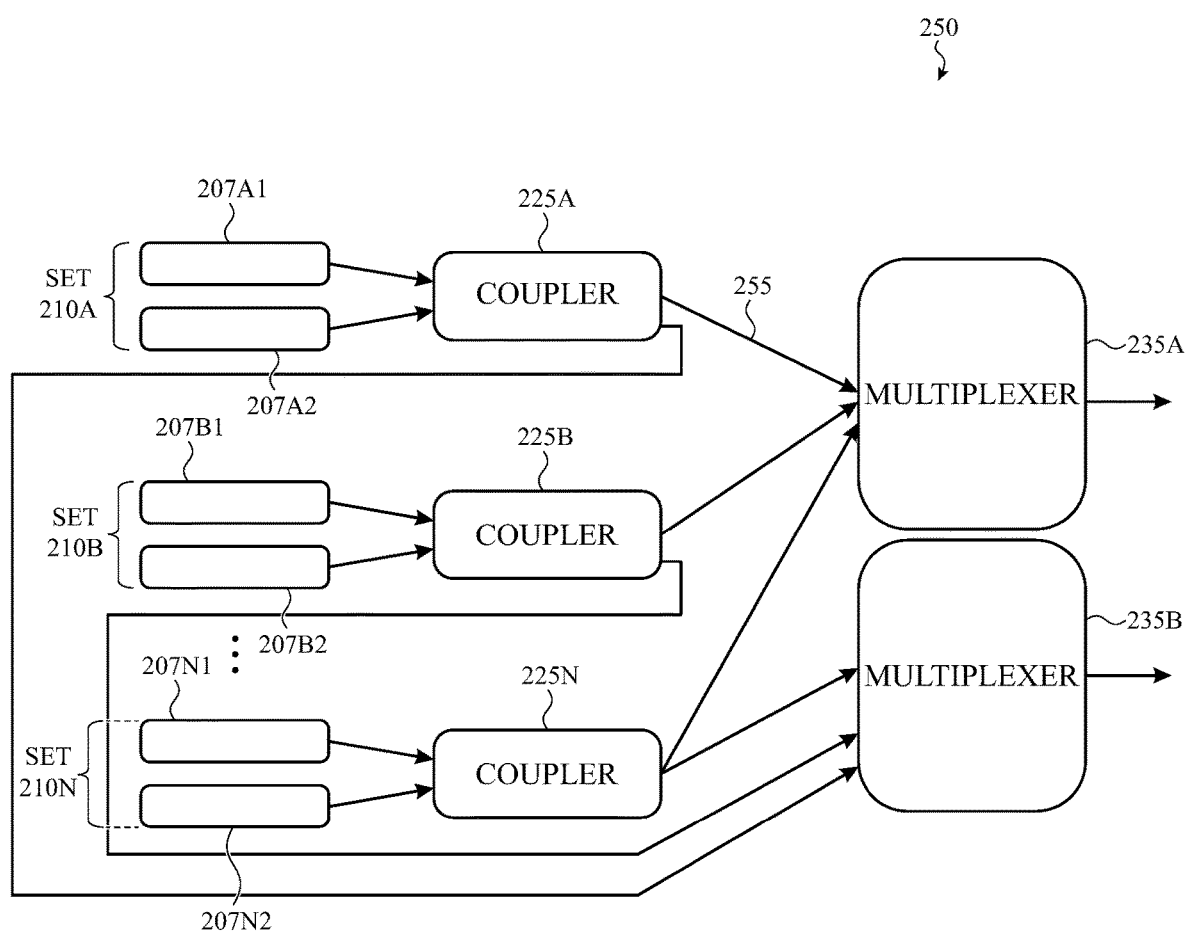

As shown in FIG. 2A, the waveguides may cross one another in between the optical couplers 225 and the multiplexers 235, though in other variations the light source module may be configured so that the waveguides do not cross. FIG. 2B illustrates an example light source module 250. The light source module 250 is similar to the light source module 200 of FIG. 2A and includes multiple light source sets 210 of light sources 207, optical couplers 225, and multiplexers 235 discussed previously, except that the light paths 255 connecting the optical couplers 225 and the multiplexers 235 are routed so that they do not cross each other. Because the light paths do not cross each other, less light may couple between the waveguides due to the lack of proximity to one another.

Figure 3:
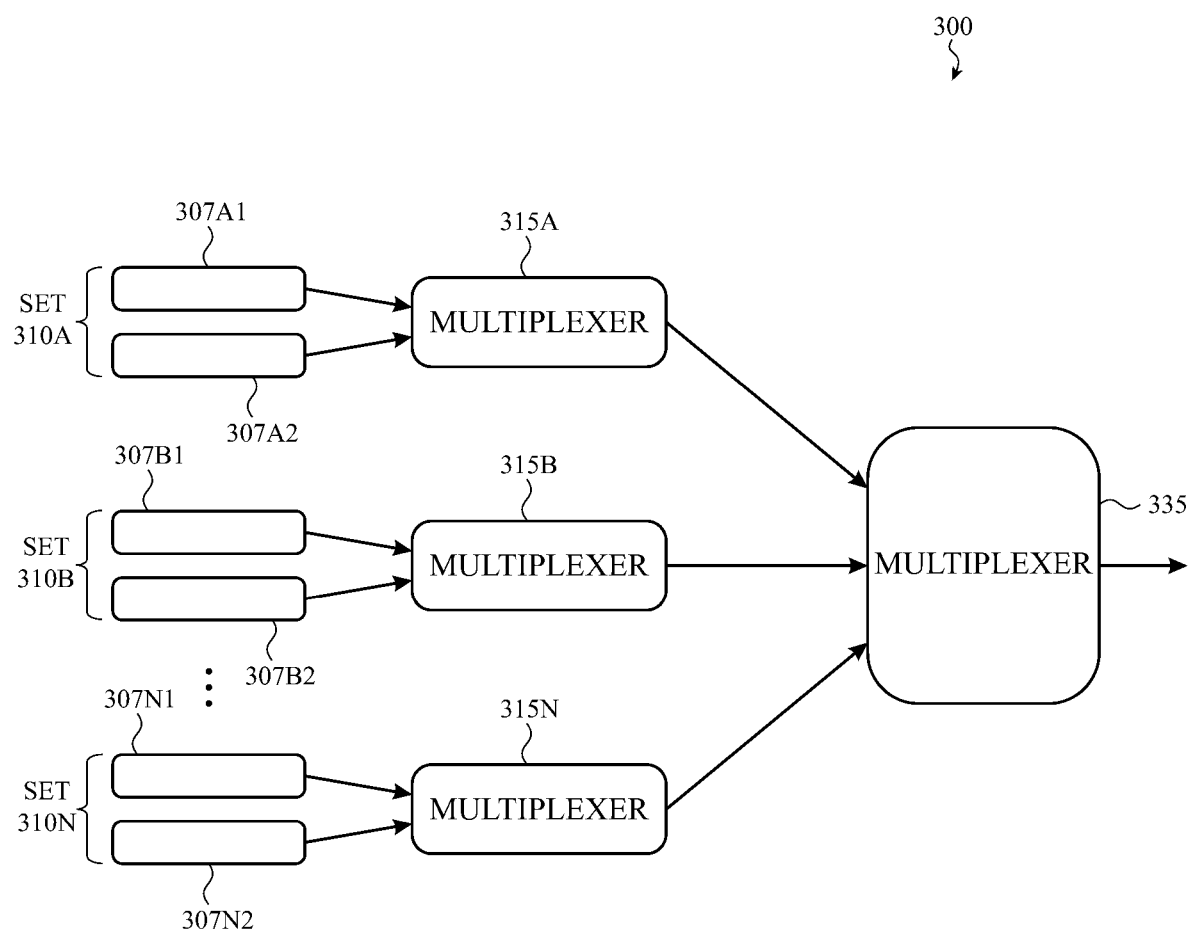
FIG. 3 illustrates a schematic diagram of an example light source module that utilizes a set of multiplexers to combine light generated by corresponding light source sets.

FIG. 3 illustrates an example light source module. The light source module 300 of FIG. 3 includes light source sets 310, light sources 307, a set of multiplexers 315, and multiplexer 335. In some examples and distinct from FIGS. 2A and 2B, the multiplexers 315 may be wavelength dependent and the light source module 300 supplies one output of light. The single light output of the multiplexer 335 may allow the light source module 300 to be smaller in physical size than the light splitting systems such as the light source modules 200 and 250 discussed with respect to FIGS. 2A and 2B, respectively. The output of the multiplexer 335 may still be split to allow the light source module 300 to provide multiple outputs to be used by the optical measurement system.

Similar to the discussion of FIGS. 2A and 2B, in FIG. 3, the light sources 307 may provide light to the set of multiplexers 315, which may then provide light to the multiplexer 335. Specifically, each light source set 310 is associated with a corresponding multiplexer 315 of the set of multiplexers 315. A first light source 307 of a light source set 310 is optically connected to a first input of a corresponding multiplexer 315 and a second light source 307 of the light source set 310 is optically connected to a second input of the corresponding multiplexer 315. The multiplexer 315 combines the light from its inputs into a common output, which is optically connected to a corresponding input of the multiplexer 335. The multiplexer 335 may combine light received by its inputs (though it should be appreciated that in some instances the multiplexer 335 only receives light at one of its inputs at a given time) into a common output, which may be utilized the optical measurement system to perform a spectroscopic measurement as discussed above.

Because the multiplexers 315 are wavelength specific, they are used to combine different wavelengths of light generated by the light source set 310, such as when a given light source set 310 is used to generate wavelengths with different coherent noise views as discussed above. For example, the wavelengths generated by light sources 307A1 and 307A2 of the first light source set 310A are separated by at least one nanometer (e.g., the wavelength of light generated by the light source 307A1 is at least one nanometer apart from the wavelength of a light generated by the light source 307A2). Each of the light source sets may be similarly configured. Additionally, the wavelengths of a given light source set may be positioned close enough to each other to allow these wavelengths to be multiplexed by multiplexer 335 without incurring significant losses. The light sources 307 of a given light source set 310 may be operated simultaneously or sequentially, and may be used to provide redundancy and/or increase optical power as discussed above.

The set of multiplexers 315 and multiplexer 335 may include any suitable multiplexers such as those discussed above, and each of these multiplexers may be designed specifically for the wavelengths being multiplexed. For example, a first multiplexer 315A may be designed to multiplex the wavelengths generated by the light sources 307A1 and 307A2 of the first light source set 310A, while a second multiplexer 315B may be designed to multiplex the wavelengths generated by the light sources 307B1 and 307B2 of the second light source set 310B.

In some instances, the set of multiplexers 315 may be replaced with a set of 2×2 controllable switches, such as discussed above. Specifically, a first input of a controllable switch is optically connected to one light source 307 of a light source set 310 and the second input of the controllable switch is optically connected to the other light source 307 of the light source set 310. Similarly, a first output of the controllable switch is optically connected to the multiplexer 335 and a second output of the controllable switch is left disconnected, such that each 2×2 controllable switch acts as a 2×1 switch. In these instances, the controllable switch may be controlled whether light generated from a first light source 307 of a light source set 310 or a second light source 307 of the light source set 310 is routed to the multiplexer 335.

Figure 4:
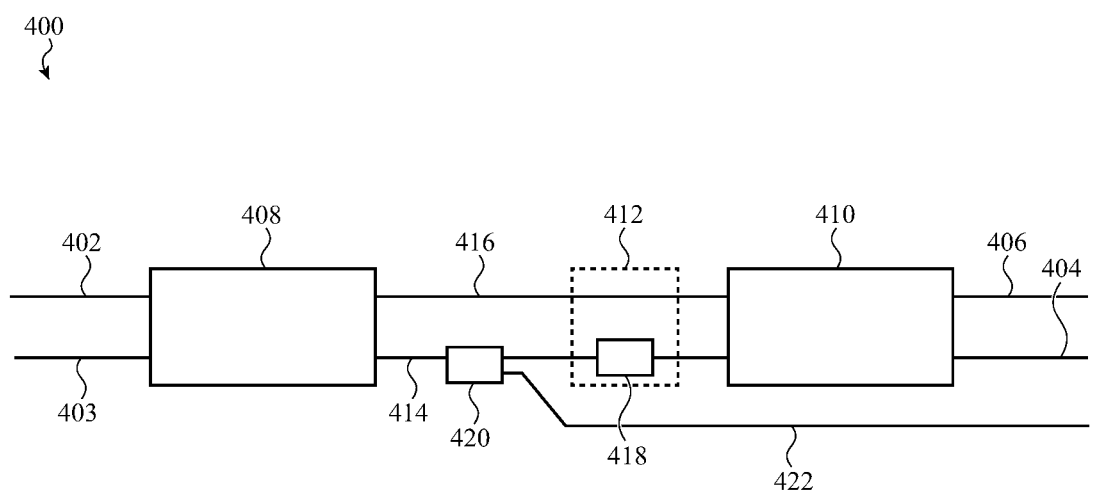
FIG. 4 depicts a variation of a controllable switch that may be used with the light source modules described herein.

For example, FIG. 4 depicts a variation of a controllable switch suitable for use with the light source modules described herein. FIG. 4 shows a variation of a 2×2 controllable switch 400 having two inputs (a first input 402 and a second input 403) and two outputs (a first output 404 and a second output 406). As shown there, the controllable switch has a first 2×2 coupler 408, a 2×2 coupler 410, and a controllable phase tuner 412 positioned between the first 1×2 coupler 408 and the second 2×2 coupler 410. In the variation of 2×2 controllable switch 400 shown in FIG. 4, the first 2×2 coupler 408 uses the first input 402 and second input 403 as inputs, and uses a first leg 414 and a second leg 416 as outputs. Light received by either the first input 402 or the second input 403 of the 2×2 controllable switch 400 is split by the first 2×2 coupler 408 between the first leg 414 and the second leg 416.

Similarly, the second 2×2 coupler 410 receives light from the first leg 414 and the second leg 416 as inputs and uses the first output 404 and the second output 406 of the 2×2 controllable switch 400 as outputs. Light received by each input of the second 2×2 coupler 410 is split between the first output 404 and the second output 406 according to a corresponding predetermined splitting ratio. It should be appreciated that the first input 402, second input 403, first output 404, second output 406, first leg 414, and second leg 416 may each be a waveguide.

The relative amounts of light that are coupled into the first output 404 and the second output 406 depend at least on 1) relative amounts of light in the first leg 414 and the second leg 416 as it enters the second 2×2 coupler 410, 2) the phase difference between the light in the first leg 414 and the second leg 416 as it enters the 2×2 coupler 410, and 3) the wavelength of the light. As such, changing the phase difference between the first leg 414 and the second leg 416 changes the distribution of light between the first output 404 and the second output 406. By adjusting the phase difference between the first leg 414 and the second leg 416, the 2×2 controllable switch 400 may take light received from one of its inputs (e.g., the first input 402 or the second input 403) and selectively route light entirely to the first output 404, entirely to the second output 406, or simultaneously to both the first output 404 and the second output 406 (i.e., split between the outputs according to a target splitting ratio). Furthermore, control of the controllable phase tuner 412 may be adjusted to account for the wavelength of light introduced into the 1×2 controllable switch, such that a desired output of the 2×2 controllable switch may be achieved for any of the wavelengths used to perform a spectroscopic measurement.

To adjust the phase difference between the first leg 414 and the second leg 416, the controllable phase tuner 412 includes one or more phase shifters that selectively modulate the phase of light passing through either the first leg 414 or the second leg 416. Examples of suitable phase shifters include, for example, electrooptic phase shifters that change the refractive index of a portion of a waveguide using an applied electric field (e.g., via carrier injection), thermo-optic phase shifters that change the refractive index of a portion of a waveguide by changing its temperature, and optomechanical phase shifters (e.g., a MEMS phase shifter) where a moveable structure (e.g., a suspended waveguide) is moved to change an amount evanescent coupling with the waveguide.

The controllable phase tuner 412 may include a single phase shifter positioned to change the phase of light in one leg (either the first leg 414 or the second leg 416), or may include multiple phase shifters (each of which may be independently controlled). In some instances, the controllable phase tuner 412 includes multiple phase shifters where at least one phase shifter is positioned to change the phase of light in the first leg 414 and at least one phase shifter is positioned to change the phase of light in the second leg 416. Additionally or alternatively, the controllable phase tuner 412 may include multiple phase tuners positioned to change the phase of light in one of the legs. In the variation of the 2×2 controllable switch 400 shown in FIG. 4, the controllable phase tuner 412 includes a single phase shifter 418 positioned to change the phase of light in the first leg 414.

In some instances, a controllable switch may also be configured to tap off a portion of light received by the controllable switch. This may be desirable in an instance where a light source module is used to pass light to a wavelength locking unit as described below with respect to FIG. 9. For example, the 2×2 controllable switch 400 shown in FIG. 4 includes a tap 420 (e.g., an optical waveguide tap) that extracts a portion of the light from a leg of the controllable switch 400 into a separate waveguide 422. The waveguide 422 may carry light to another portion of the optical measurement system (e.g., a wavelength locking unit as discussed herein). While shown as tapping light from a leg having a phase shifter (the first leg 414 in FIG. 4), the tap 420 may alternatively tap light from a leg that does not include a phase shifter (the second leg 416 in FIG. 4).

In other instances, a controllable switch may be configured as a 1×2 or 2×1 controllable switch. In some of these variations, a controllable switch may include a 1×2 coupler instead of the first 2×2 coupler 408 or the second 2×2 coupler 410, which would change the 2×2 controllable switch 400 discussed above into a 1×2 controllable switch or a 2×1 controllable switch, respectively. Alternatively, one input of the first 2×2 coupler 408 may be left disconnected such that the other input of the 2×2 coupler acts as the single input of the 1×2 controllable switch. Similarly, one output of the second 2×2 coupler 410 may be left disconnected, such that the other output of the second 2×2 coupler 410 acts a single output of the 2×1 controllable switch. In these instances, the second 2×2 coupler 410 may be configured with an imbalance to promote coupling light into the output of the 2×1 controllable switch.

When the variations of the light source modules described above with respect to FIGS. 2A-3, are used to combine the outputs of a light source set having similar wavelengths (e.g., pairs of light sources emitting light at wavelengths separated by less than a handful of nanometers as discussed above), these outputs are combined before they are multiplexed with the outputs of other light source sets. Accordingly, a single light path (e.g., waveguide) is used to transfer any light generated by a given light source set to a corresponding input of a wavelength-selective multiplexer such as the multiplexers 235A, 235B, or 335 discussed previously. Because different wavelengths of light are introduced into a single input of the wavelength-selective multiplexer, there may be some intrinsic loss associated with this multiplexing. While this intrinsic loss may be relatively small in many instances, this loss may increase as spacing between wavelengths in a light source set increases, and may further increase if any of the light sources are chirped during operation.

Figure 5:
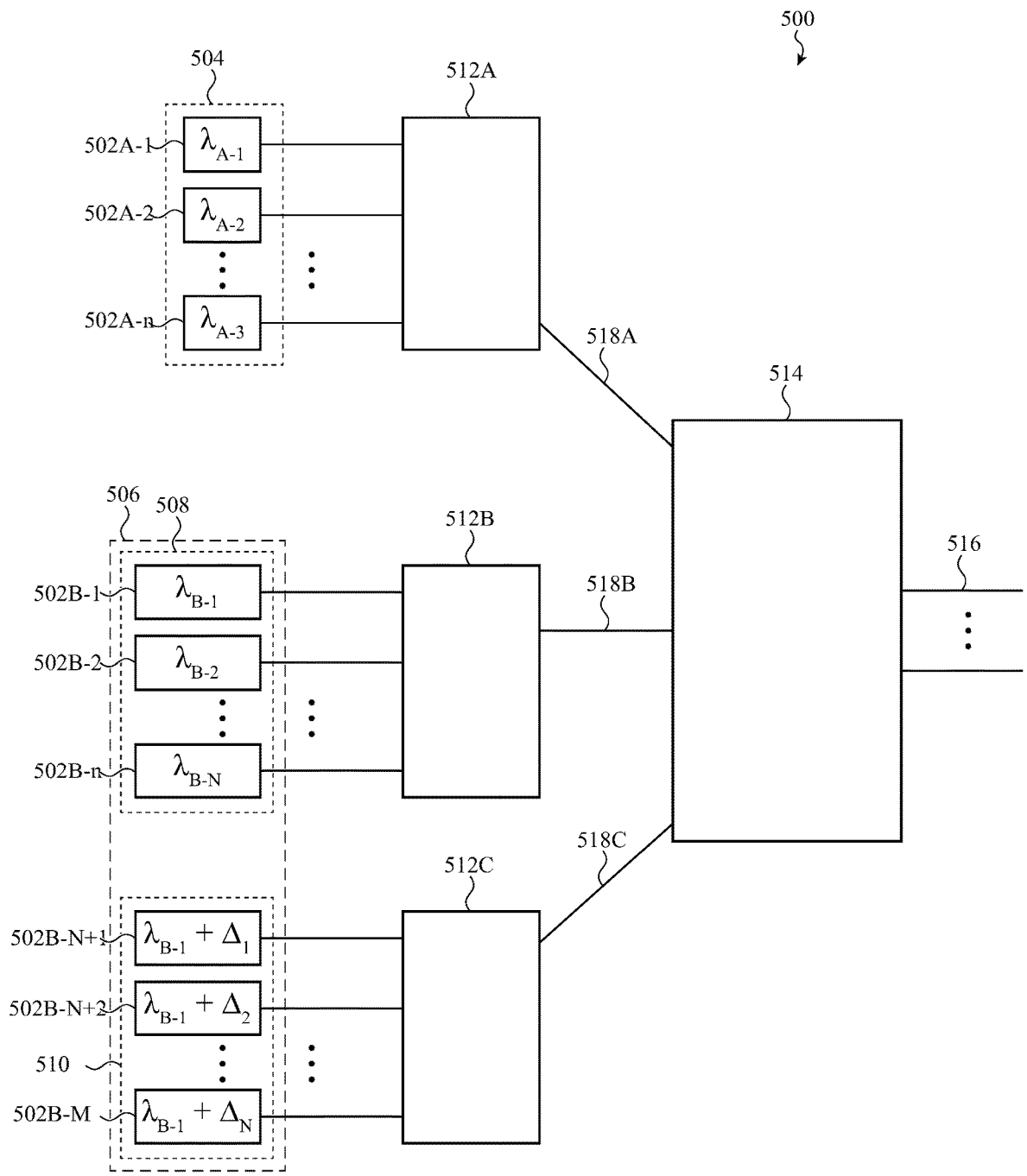
FIGS. 5-9 show schematic diagrams of example light source modules that each utilize a set of wavelength-selective multiplexers and a multiplexing unit to combine light generated by multiple light source sets.

FIG. 5 shows another variation of a light source module 500 as described herein.

Specifically, the light source module 500 includes a plurality of light sources 502, each of which is configured to generate light at a corresponding wavelength. These light sources 502 include one or more pairs of light sources 502, where the wavelengths of light sources are separated by less than a target separation amount. In some instances, this target separation may be selected so that these light sources 502 generate spectroscopically equivalent wavelengths. The target separation will be discussed in this embodiment as 5 nanometers (i.e., each of these pairs of light sources 502 generate light at corresponding wavelengths separated by less than 5 nanometers), though it should be appreciated that other values may be selected based on the system (e.g., 4 nanometers or 3 nanometers as discussed above).

In some instances, the light source module 500 includes at least one additional light source 502 that is not part of a pair as discussed above (referred to herein as an "unpaired light source"). For each such unpaired light source 502, the wavelength of light generated by that light source 502 is separated by at least the target separation amount (e.g., 5 nanometers) from the wavelengths produced by the remaining light sources 502 of the light source module 500. For example, FIG. 5 shows a set of unpaired light sources 504 and a set of paired light sources 506. The set of unpaired light sources 504 includes one or more unpaired light sources (e.g., light sources 502A-1 to 502A-N) each having a corresponding wavelength (e.g., $\lambda_{A-1}$ to $\lambda_{A-N}$).

The set of paired light sources 506 includes a plurality of light sources (e.g., light sources 502B-1 to 502B-M) that form one or more light source pairs that generate wavelengths separated by less than the target separation. In the light source modules described in relation to FIGS. 2A, 2B, and 3, the outputs of these light source pairs are first combined before they are combined with the outputs of other light sources. Conversely, in light source module 500, each light source of a given light source pair is divided into a different subset of light sources 502. For example, as shown in FIG. 5, the set of paired light sources 506 includes a first light source subset 508 and a second light source subset 510. There are N different light source pairs shown in FIG. 5 (which may be the same or a different number as the number of light sources in the set of unpaired light sources 504), and each light source pair includes one light source in the first light source subset 508 and one light source in the second light source subset 510. For example, a first light source pair may include a first light source 502B-1 that is part of the first light source subset 508 and a second light source 502B-N+1 that is part of the second light source subset 510. The first light source 502B-1 has a wavelength $\lambda_{B-1}$ and the second light source 502B-N+1 has a wavelength $\lambda_{B-1}+\Delta_1$ (where $\Delta_1$ is less than the target separation amount). Similarly, a second light source pair may include a first light source 502B-2 that is part of the first light source subset 508 and a second light source 502B-N+2 that is part of the second light source subset 510, and generate wavelengths that are separated by a $\Delta_1$ that is also less than the target separation amount. In some instances, the light sources 502 within a given light source subset (e.g., the first light source subset 508 and/or the second light source subset 510) may generate wavelengths that are all separated by at least the target separation within the light source subset.

The light sources 502 of the set of unpaired light sources 506, the first light source subset 508 and the second light source subset 510 may be multiplexed using a set of wavelength-specific multiplexers 512. Specifically, the set of unpaired light sources 506 is multiplexed using a first wavelength-specific multiplexer 512A, such that an output of each of the light sources 502A-1 to 502A-N is optically connected (e.g., via a waveguide) to a corresponding input of the first multiplexer 512A. The first light source subset 508 is multiplexed using a second wavelength-specific multiplexer 512B, such that an output of each of the light sources 502B-1 to 502B-N is optically connected (e.g., via a waveguide) to a corresponding input of the second multiplexer 512B. Similarly, the second light source subset 510 is multiplexed using a third wavelength-specific multiplexer 512C, such that an output of each of the light sources 502B-N+1 to 502B-M is optically connected (e.g., via a waveguide) to a corresponding input of the third multiplexer 512C. It should be appreciated that in some instances the second multiplexer 512B and/or the third multiplexer 512C may also multiplex the outputs of one or more unpaired light sources in addition to the set of paired light sources.

Each of the wavelength-specific multiplexers 512A, 512B, and 512C may be tailored to specific wavelengths produced by light sources 502 connected thereto. Because the pairs of light sources are divided between the light source sets 508 and 510, they will each be multiplexed by a different wavelength-specific multiplexer, and thus each of the second multiplexer 512B and the third multiplexer 512C may be designed with additional space between the inputs to these multiplexers as compared to instances where the light sources of a given pair are optically connected to different inputs of a single multiplexer.

The first wavelength-specific multiplexer 512A has an output 518A that will output light generated by each light source of the set of unpaired light sources 504. The second wavelength-specific multiplexer 512B has an output 518B that will output light generated by each light source of the first light source subset 508. The third wavelength-specific multiplexer 512C has an output 518C that will output light generated by each light source of the second light source subset 510. Each of these outputs 518A, 518B, and 518C may be optically connected to a multiplexing unit 514 that routes light from each of the outputs 518A, 518B, and 518C to a common set of outputs for the light source module 500.

Accordingly, light emitted by a given light source 502 will be routed through one of the wavelength-specific multiplexers 512A, 512B, or 512C and the multiplexing unit 514 before it is outputted from the light source module 500. Each output of the common set of outputs may be capable of outputting light from every light source 502 of the set of unpaired light sources 506, the first light source subset 508 and the second light source subset 510 (though it should be appreciated that that the multiplexing unit 514 may also include one or more additional outputs that are only capable of outputting light from a subset of these light sources). This allows a wide range of wavelengths to be routed a common output or outputs of the light source module 500. When used in an optical measurement system as described herein, this allows light of any of the wavelengths generated by the light source module 500 to be launched from a given launch site to perform spectroscopic measurements.

When a spectroscopic measurement is performed by taking a plurality of individual measurements at different wavelengths, either one or two light sources of the light source module 500 may be active at a given time. For example, when an individual measurement is performed using a wavelength associated with an unpaired light source, the corresponding light source may be the only light source actively generating light during the individual measurement. Conversely, when an individual measurement is performed using a wavelength associated with a paired light source, either of both of the paired light sources may be actively generating light during a given individual measurement. As discussed above, if the wavelengths generated by the light source pair are spectroscopically equivalent for a given spectroscopic measurement, generating light simultaneously with a light source pair may increase (e.g., double) the optical power for that measurement, as the optical measurement system will treat this light as if it were generated at a single wavelength for the purpose of calculating spectroscopic information. When the wavelengths are selected to provide different coherent noise views, this may also reduce coherent noise associated with the spectroscopic measurement. Alternatively, a single light source of a pair may be active at a time, for example in stances where the additional optical power is not needed or when the other light source of the pair is not functioning properly. Accordingly, in some instances a given spectroscopic measurement includes a plurality of individual measurements using different pairs of light sources, where both light sources simultaneously generate light at different wavelengths, and may further include one or more additional individual measurements during which a single wavelength of light is generated (e.g., via a single light source).

The multiplexing unit 514 may include any component or components capable of routing the outputs of the set of multiplexers 512 to a common set of outputs 516. Because each input to the multiplexing unit 514 can include a range of wavelengths depending on which light source 502 is active at a given moment, the multiplexing unit 514 may leverage wavelength-independent components to route light.

Figure 6:
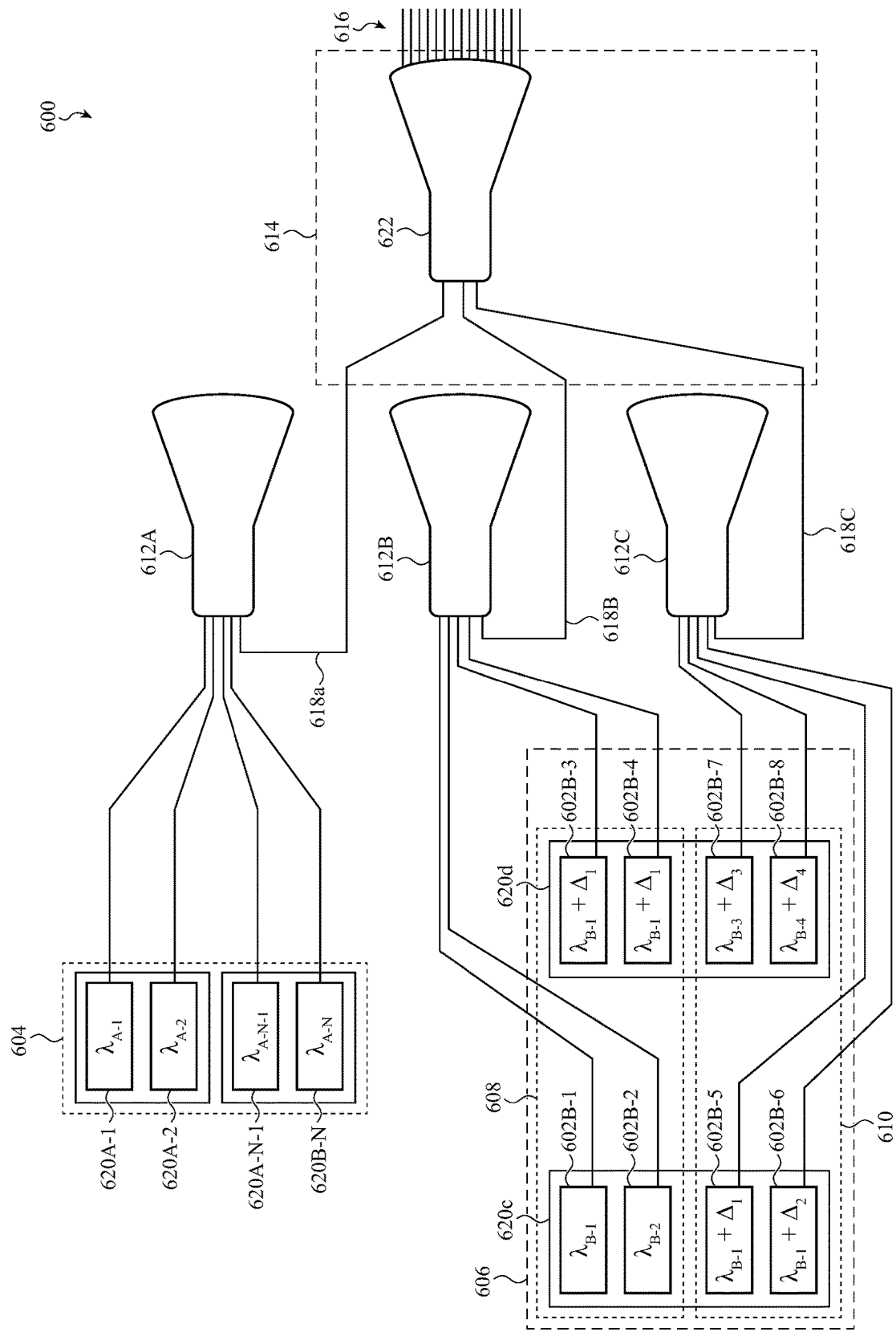

FIG. 6 shows one example of a light source module 600 utilizing a multiplexing unit 614 having a star coupler 622. As shown there, the light source module 600 includes a set of unpaired light sources 604 and a set of paired light sources 606 divided into a first light source subset 608 and a second light source subset 610. These light sources 602 may be configured as discussed above with respect to the light source module 500 of FIG. 5. For the sake of illustration, four light sources 602A-1, 602A-2, 602A-N−1 and 602A-N (that generate corresponding wavelengths $\lambda_{A-1}$, $\lambda_{A-2}$, $\lambda_{A-N-1}$, and $\lambda_{A-N}$) that represent a set of N light sources are shown in the set of unpaired light sources 604. Similarly, four sets of paired light sources are shown in FIG. 6. This includes a first pair of light sources 602B-1 and 602B-5 that generate wavelengths separated by a first separation amount $\Delta_1$, a second pair of light sources 602B-2 and 602B-6 that generate wavelengths separated by a second separation amount $\Delta_2$, a third pair of light sources 602B-3 and 602B-7 that generate wavelengths separated by a third separation amount $\Delta_3$, and a fourth pair of light sources 602B-4 and 602B-8 that generate wavelengths separated by a fourth separation amount $\Delta_4$. Each of the separation amounts $\Delta_1$-$\Delta_4$ are less than a target separation amount as discussed. The first light source set 608 includes a first light source from each light source pair (e.g., 602B-1, 602B-2, 602B-3, and 602B-4) and the second light source set 608 includes a second light source from each light source pair (e.g., 602B-5, 602B-6, 602B-7, and 602B-8).

The outputs of the light sources from the set of unpaired light sources 604, the first light source subset 608, and the second light source subset 610 are respectively multiplexed by a first wavelength-selective multiplexer 612A, a second wavelength-selective multiplexer 612B, and a third wavelength-selective multiplexer 612C as discussed above. The first wavelength-specific multiplexer 612A has an output 618A that will output light generated by each light source of the set of unpaired light sources 604. The second wavelength-specific multiplexer 612B has an output 618B that will output light generated by each light source of the first light source subset 608. The third wavelength-specific multiplexer 612C has an output 618C that will output light generated by each light source of the second light source subset 610. Each of these outputs 618A, 618B, and 618C may be optically connected to the multiplexing unit 614.

As mentioned previously, the multiplexing unit 614 includes a star coupler 622. In the variation shown in FIG. 6, the star coupler 622 is configured as a 3×N star coupler with 3 inputs and N outputs 616. In these instances, the three outputs 618A, 618B, and 618C of the set of multiplexers 612A, 612B, and 612C act as the inputs to the star coupler 622, while the N outputs 616 may act as outputs of the light source module 600. Accordingly, the N outputs 616 may be any suitable number of outputs 616 as may be desired. The star coupler 622 is wavelength independent such that light received at any input of the star coupler 622 will be split between the N outputs 616 regardless of the wavelength of light received at that input. Accordingly, light may be generated by any light source of the set of unpaired light sources 604 and the set of paired light sources 606, and that light will be split between the N outputs 616 of the star coupler 622. The set of multiplexers 612A, 612B, and 612C, as well as the star coupler 622 may have little to no intrinsic optical loss, and may thereby provide a low-loss way to couple light from a set of light sources to a common set of outputs.

In instances where the light source module does not include the set of unpaired light sources 604 that is multiplexed by the first multiplexer 612A, the star coupler 622 may be a 2×N star coupler with a first input optically connected to output 618B and a second input optically connected to output 618C. It should also be appreciated that the star coupler 622 may be replaced with any suitable wavelength-independent M×N optical coupler.

It should be appreciated that the individual light sources of the light source modules described herein may be formed on one or more chips (e.g., laser dies) to form corresponding light source bars (e.g., laser bars), which may be incorporated into a photonic integrated circuit to form the light source module. The various light sources may be divided across different light source bars in any suitable manner. The light sources of a given light source bar may belong to the same set or subset of light sources discussed above, but need not. For example, in the variation shown in FIG. 6, light sources 602A-1 and 602A-2 of the set of unpaired light sources 604 are formed on a first light source bar 620A, while light sources 602A-N-1 and 602A-N of the set of unpaired light sources 604 are formed on a second light source bar 620B. Both light sources of each the first and second light source pairs (i.e., light sources 602B-1, 602B-2, 602B-5, and 602B-6) are formed on a third light source bar 620C, while both light sources of each the third and fourth light source pairs (i.e., light sources 602B-3, 602B-4, 602B-7, and 602B-8) are formed on a fourth light source bar 620D.

Figure 7:
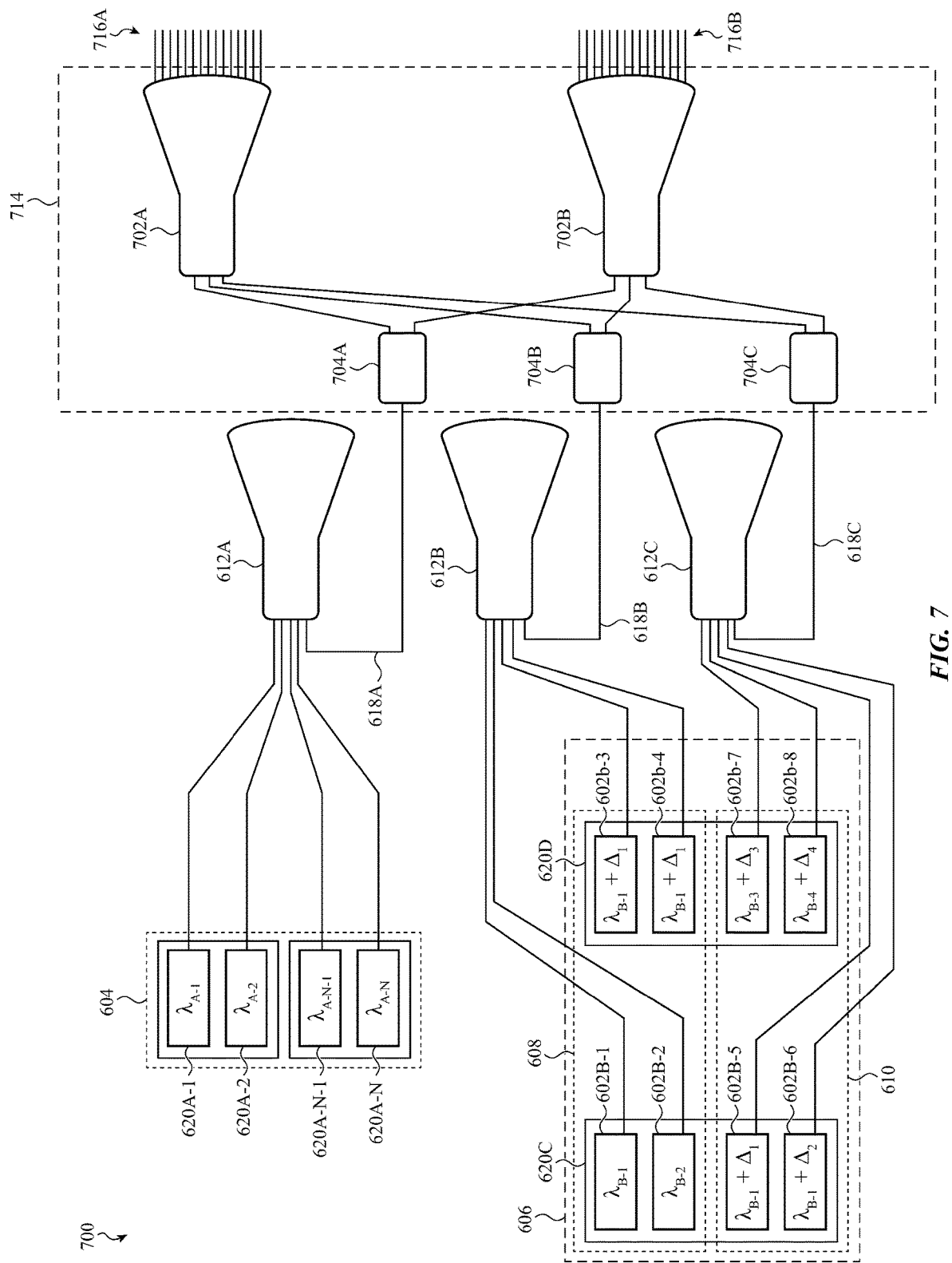

FIG. 7 shows another variation of a light source module 700. The light source module 700 is configured the same as the light source module 600 of FIG. 6 (with similar components labeled the same), except that the multiplexing unit 614 has been replaced with a multiplexing unit 714. In this embodiment, the multiplexing unit 714 includes a set of star couplers (including a first star coupler 702A and a second star coupler 702B) and a set of switches (including a first switch 704A, a second switch 704B, and a third switch 704C) optically connecting the multiplexers 612A, 612B, and 612C to the set of star couplers. The first star coupler 702A includes a first plurality of outputs 716A and the second star coupler 702B includes a second plurality of outputs 716B. The first plurality of outputs 716A and the second plurality of outputs 716B may collectively form a set of outputs for the light source module 700.

Specifically, each of the switches 704A, 704B, and 704C may be configured as a 1×2 controllable switch as discussed above. An input of each 1×2 controllable switch is connected to an output of a corresponding multiplexer of the set of multiplexers 612A, 612B, and 612C, while each output of the 1×2 controllable switch is connected to a different star coupler of the set of star couplers 702A and 702B. Using the first controllable switch 704A as an example, the first controllable switch 704A receives the output 618A of the first multiplexer 612A as its input, while the first and second outputs of the 1×2 controllable switch are respectively optically connected to the first star coupler 702A and the second star coupler 702B.

Each of the controllable switches can selectively route light received from its input entirely to its first output and thereby the first star coupler 702A, entirely to its second output and thereby the second star coupler 702B, or simultaneously to both the outputs and star couplers 702A and 70B (i.e., split between the star couplers 702A and 702B according to a target splitting ratio). As a result, light generated by any light source of the light source module 700 may be selectively routed to and split between one or both of the first and second plurality of outputs 716A and 716B. Because this routing is wavelength specific, each controllable switch may account for the wavelength that is currently being routed by that switch (e.g., by controlling a phase tuner of the switch as discussed above. If a given multiplexer (e.g., the first multiplexer 612A) only receives and outputs a single wavelength of light at a time, the adjustment of the corresponding controllable switch (e.g., the first controllable switch 704A) to account for the current wavelength allows the controllable switch to act as a wavelength-independent component.

The star couplers 702A and 702B are shown as 3×N star couplers that each receive a corresponding input from each of the first, second, and third multiplexers 612A, 612B, and 612C via the controllable switches 704A, 704B, and 704C. In instances where the light source module 700 does not include the set of unpaired light sources 604 and the first multiplexer 612A, the star couplers 702A and 702B may optionally be configured as 2×N star couplers as discussed above. As a result, light generated by any light source of the light source module 700 may be selectively routed to either or both of the star couplers 702A and 70B. This light is accordingly routed to and split between one or both of the first and second pluralities of outputs 716A and 716B.

During a spectroscopic measurement, one or more light sources may be active to perform an individual measurement at a given wavelength. In some instances, a single light source (e.g., a light source from the set of unpaired light sources 604, the first light source subset 608, or the second light source subset 610) may generate light at a given wavelength, and this light may be selectively routed to one or both of the star couplers 702A and 702B to perform an individual measurement using that wavelength. Conversely, when an individual measurement is performed using a wavelength associated with a paired light source (e.g., the first pair of light sources 602B-1 and 602B-5), either of both of the paired light sources may be actively generating light during a given individual measurement.

For example, light from the first light source 602B-1 and the second light source 602B-5 of the light source pair may simultaneously generate light during an individual measurement that is spectroscopically equivalent for a given spectroscopic measurement. In some instances, the second and third controllable switches 704B and 704C simultaneously route respective light from the first and second light sources 602B-1 and 602B-5 (i.e., via the second and third multiplexers 612B and 612C) to the same selection of star couplers. For example, these switches may simultaneously route light from the first and second light sources 602B-1 and 602B-5 only to the first star coupler 702A, only to the second star coupler 702B, or split between the first and second star couplers 702A and 702B. When these wavelengths are spectroscopically equivalent for a given spectroscopic measurement, this may increase (e.g., double) the optical power received by the star couplers 702A and 702B. When these wavelengths are selected to provide different coherent noise views, this may also reduce coherent noise associated with the spectroscopic measurement.

In other instances, the star couplers 702A and 702B may simultaneously receive light from different multiplexers, which may allow the first star coupler 702A to receive a first wavelength of light while the second star coupler 702B receives a second wavelength of light. Accordingly, the light source may simultaneously output the first wavelength of light from the first plurality of outputs 716A and the second wavelength of light from the second plurality of outputs 716B. This may allow the optical measurement system to perform multiple individual measurements simultaneously using two different wavelengths, with the tradeoff that each individual measurement utilizes a subset of the outputs of the light source module. In some of these instances, one of the star couplers 702A and 702B also simultaneously receives light of a third wavelength. For example, the first star coupler may receive light generated by a light source of the set of unpaired light sources 604 (e.g., light source 602A-1), and the first set of outputs 716A output light of a first wavelength ($\lambda_{A-1}$). The second star coupler 702B simultaneously receives light from a light source pair (e.g., light source 602B-1 and 602B-5), and the second set of outputs 716B outputs light with the first and second wavelengths ($\lambda_{B-1}$ and $\lambda_{B-1}+\Delta_1$).

While shown in FIG. 7 as having two star couplers 702A and 702B, the light source module 700 may alternatively have a set of star couplers including three of more star couplers (any of which may be replaced by another suitable optical coupler). In these instances, the light source module 700 may include wavelength-independent optical couplers and/or additional controllable switches positioned between the multiplexers 612A, 612B, and 612C and the three or more star couplers to facilitate forming an optical connection between each of the multiplexer outputs 618A, 618B, and 618C and each star coupler.

Figure 8:
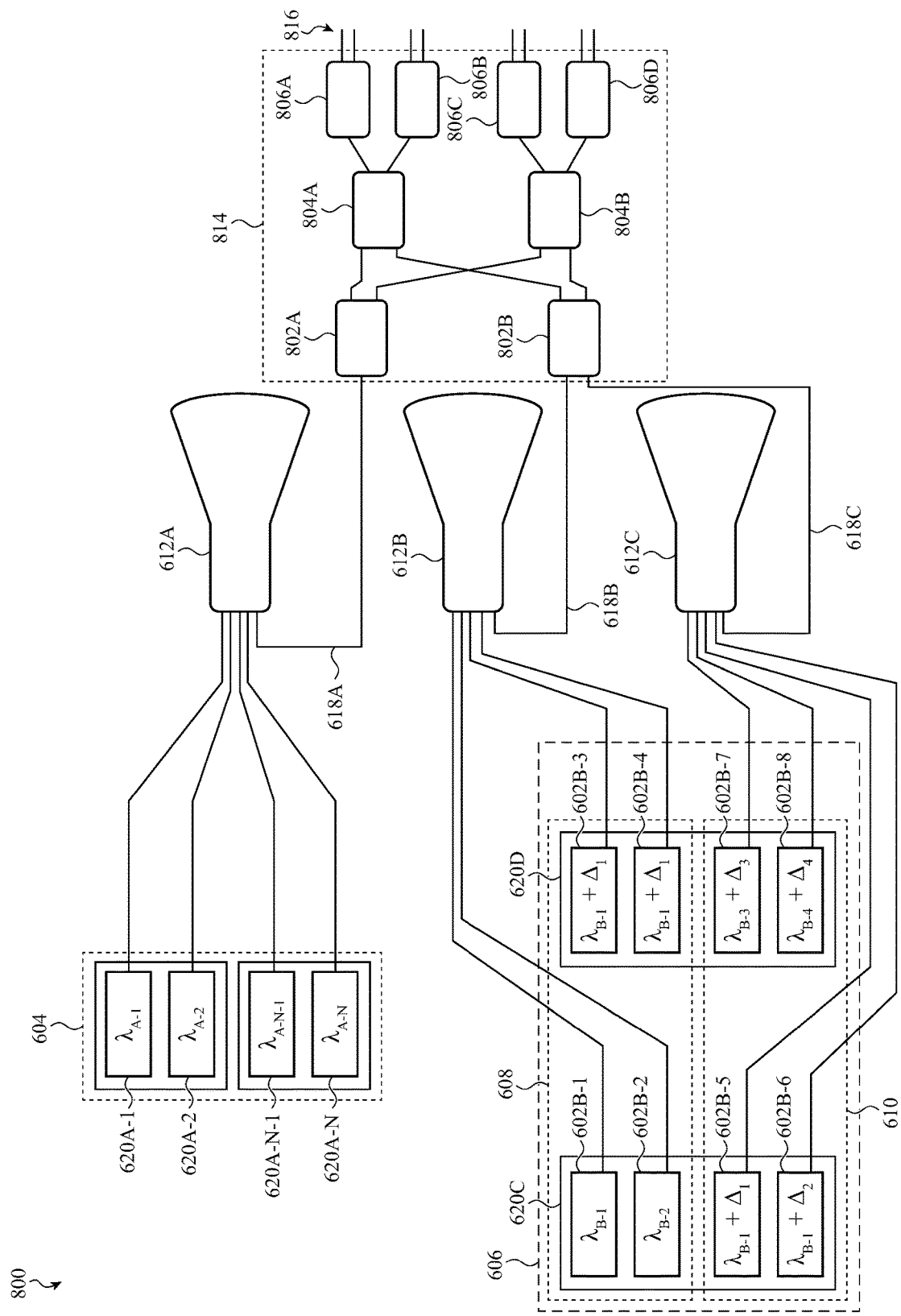

FIG. 8 shows yet another variation of a light source module 800. The light source module 800 is configured the same as the light source module 600 of FIG. 6 (with similar components labeled the same), except that the multiplexing unit 614 has been replaced with a multiplexing unit 814. In this embodiment, the multiplexing unit 814 is configured as a cascaded network of optical couplers that split light received from any of the multiplexers 612A, 612B, and 612C between a plurality of outputs 816 that act as outputs for the light source module 800. The cascade network of optical couplers includes a number of stages, each having one or more optical couplers.

The number of stages, as well as the number of optical couplers in each stage, depends at least in part on the number of inputs to the cascade network of optical switches (e.g., how many multiplexer outputs are being combined) and the number of outputs 816. In the variation shown in FIG. 8, the cascade network of optical switches has three inputs and eight outputs, and includes a first stage including a first optical coupler 802A and second optical coupler 802B, a second stage including a first optical coupler 804A and a second optical coupler 804B, and a third stage including four optical couplers 806A-806D.

The first optical coupler 802A of the first stage is a 1×2 or 2×2 optical coupler (e.g., with one of its inputs left disconnected) that receives the output 618A of the first multiplexer 612A as its input. The outputs of the first optical coupler 802A are each optically connected to a first input of a corresponding optical coupler 804A or 804B of the second stage. In this way, light received by the first optical coupler 802A of the first stage will be split between the optical couplers 804A and 804B of the second stage.

The second optical coupler 802B of the first stage is a 2×2 optical coupler that receives the output 618B of the second multiplexer 612B as its first input and the output 618C of the third multiplexer 612B as its second input. The outputs of the second optical coupler 802B are each optically connected to a second input of a corresponding optical coupler 804A or 804B of the second stage. In this way, light received by the first optical coupler 802A of the first stage will be split between the optical couplers 804A and 804B of the second stage.

The optical couplers 804A and 804B of the second stage are 2×2 optical couplers, and split light received at either input between its two inputs. Because each of these optical couplers 804A and 804B are optically connected to each of the multiplexers 612A, 612B, 612C, these optical couplers 804A and 804B will output a portion of light generated by any of the light sources (e.g., light sources of the set of unpaired light sources 504 and the set of paired light sources 506).

The optical couplers 806A-806D of the third stage may be 1×2 optical couplers, each of which splits a corresponding output of an optical coupler 804A or 804B of the second stage into two different outputs. As a result, while the second stage of optical couplers 804A and 804B has four outputs that would output a corresponding portion of light generated by a given light source of the light source module 800, the third stage of optical couplers 806A-806C doubles this number of outputs.

Each of the optical couplers may receive a range of different wavelengths, and are thus configured to be wavelength independent. Because each optical coupler 802A and 802B of the first stage is optically connected to a corresponding subset of the light source of the light source module 800, these optical couplers 802A and 802B may be tailored to operate with the wavelengths associated with these light sources, while the optical couplers of subsequent stages may be tailored to operate with the full range of wavelengths of the light source module 800.

In instances where a multiplexing unit is capable of selectively routing light between different subsets of outputs using controllable switches (such as the multiplexing unit 714 of FIG. 7), it may be desirable to structure the multiplexing unit such that light generated by every light source of the light source module will pass through a common component of the multiplexing unit. This may be useful in instances where the light source module includes a wavelength locking unit for controlling the wavelength emitted by the individual light sources, as a single tap may be used to lock the wavelength generated by any of the light sources of the light source module.

When a light source module includes a wavelength locking unit, the wavelength locking unit can output a signal that is indicative of the wavelength or changes in wavelength of light received by the wavelength locking unit, which may be used by a controller (e.g., controller 140) to control a given light source to stabilize or otherwise adjust the wavelength of light emitted by that light source. Even for fixed wavelength lasers, the precise emission wavelength may vary slightly with changes in temperature and/or injection current, and thus the wavelength locking unit may provide feedback to the controller to set a stable wavelength output before or during a measurement. Any of the light source modules described herein may utilize one or more wavelength locking units configured to provide feedback to one or more light sources of the light source module.

Figure 9:
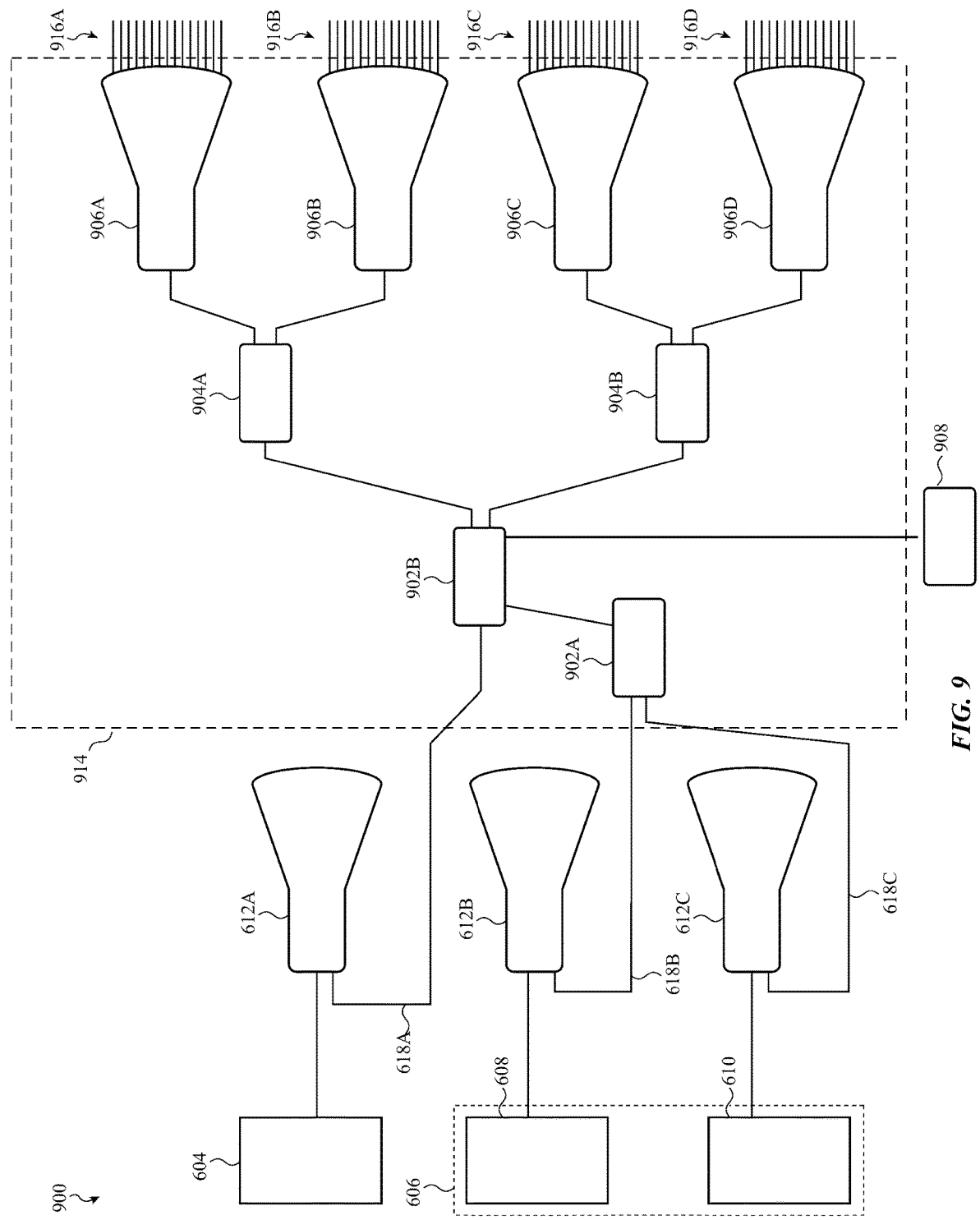

FIG. 9 shows a variation of a light source module 900. The light source module 900 is configured the same as the light source module 600 of FIG. 6 (with similar components labeled the same), except that the multiplexing unit 614 has been replaced with a multiplexing unit 914, and light source module 900 includes a wavelength locking unit 908. Additionally, the individual light sources of the set of unpaired light sources 604 and the set of paired light sources 606 are not depicted. As shown, the multiplexing unit 914 includes a 2×1 controllable switch 902A, such as discussed above, that receives the outputs 618B and 618C of the second and third multiplexers 612B and 612C as inputs. An output of the 2×1 controllable switch 902A is optically connected to a first input of a 2×2 controllable switch 902B.

The 2×2 controllable switch 902B receives the output 618A of the first multiplexer 612A as its second input, and as a result light generated by any light source of the set of unpaired light sources 604, the first light source subset 608, or the second light source subset 610 will pass through the 2×2 controllable switch 902B. The wavelength locking unit 908 may be optically connected to the 2×2 controllable switch 902B to receive a portion of light received by the 2×2 controllable switch 902B (e.g., using a tap as described above with respect to FIG. 4). Accordingly, the wavelength locking unit 908 may be used to provide feedback to any of the light sources of the light source module 900.

Additionally, the 2×2 controllable switch 902B is controllable to selectively route light received from one of its inputs to only one of its outputs or split the light between its outputs. Accordingly, the 2×2 controllable switch 902B may be used to selectively split light between some or all of the outputs of the multiplexing unit 914 (such as described above with respect to FIG. 7). Additional optical elements may be used to further split these outputs and thereby provide a larger number of outputs for the light source module 900. In the embodiment shown in FIG. 9, the multiplexing unit further includes a set of 1×2 controllable switches including a first 1×2 controllable switch 904A and a second 1×2 controllable switch 904B. Each controllable switch is connected to a pair of 1×N star couplers.

Specifically, respective outputs of the first 1×2 controllable switch 904A are connected to a first 1×N star coupler 906A having a first plurality of outputs 916A and a second 1×N star coupler 906B having a second plurality of outputs 916B. The first 1×2 controllable switch 904A may selectively route light received by the 2×2 controllable switch 902B either to the first 1×N star coupler 906A, to the second 1×N star coupler 906B, or split between the first and second star couplers 906A and 906B. Similarly, respective outputs of the second 1×2 controllable switch 904B are connected to a third 1×N star coupler 906C having a third plurality of outputs 916C and a fourth 1×N star coupler 906D having a second plurality of outputs 916D. The second 1×2 controllable switch 904B may selectively route light received by the 2×2 controllable switch 902B either to the third 1×N star coupler 906C, to the fourth 1×N star coupler 906D, or split between the third and fourth star couplers 906C and 906D. Accordingly, the light source module 900 may be able to split light from a given light source between any combination of pluralities of outputs 916A-916D.

Figure 10:
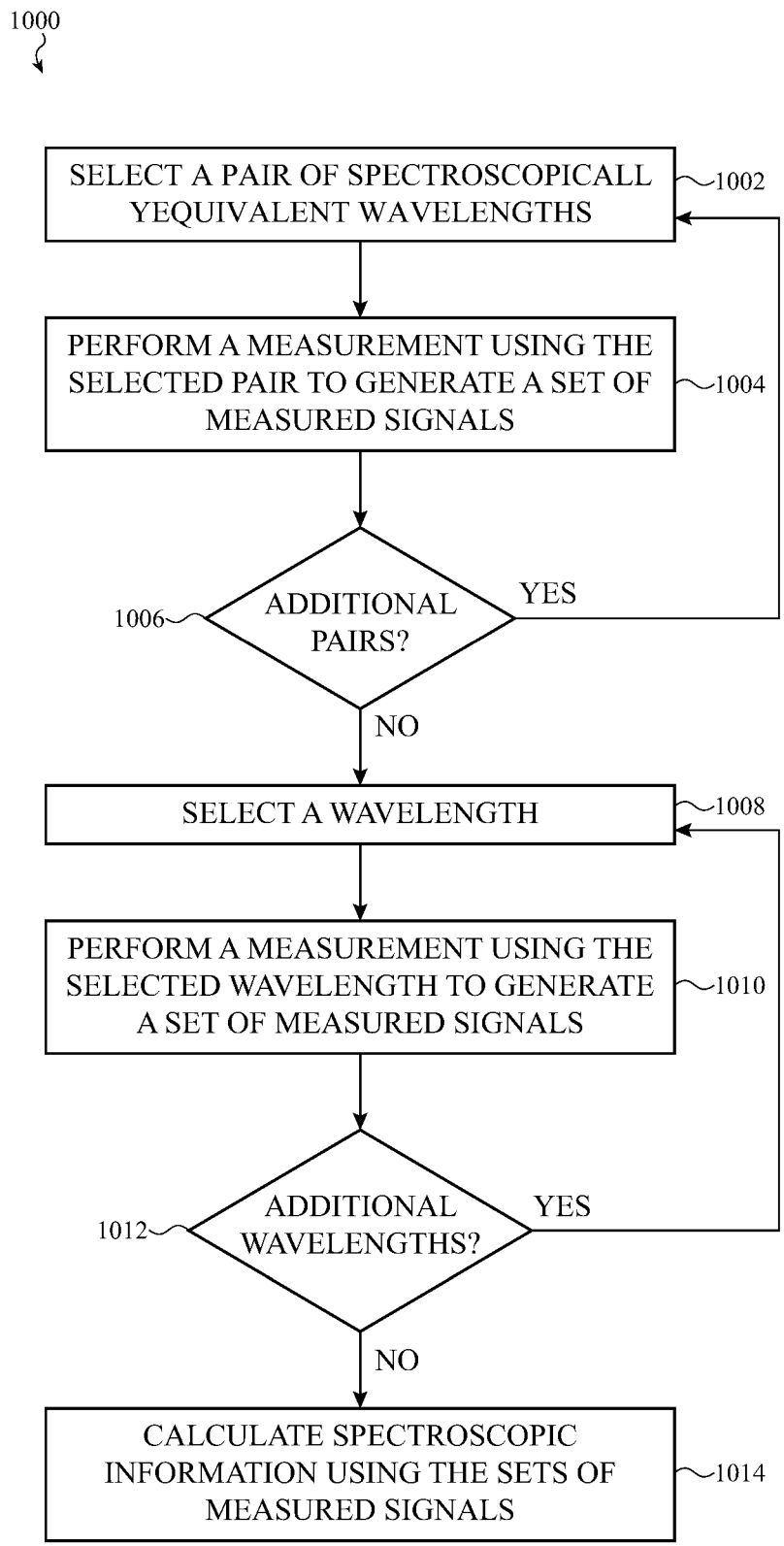
FIG. 10 depicts a method of performing a spectroscopic measurement as discussed herein.

FIG. 10 shows an example method 1000 of performing a spectroscopic measurement using the optical measurement systems described herein. The spectroscopic measurement may include a series of measurements performed while emitting pairs of spectroscopically equivalent wavelengths, and optionally a series of measurements performed while emitting different wavelengths. For example, step 1002 may involve selecting (e.g., using a controller as discussed above) a pair of wavelengths that are spectroscopically equivalent for that spectroscopic measurement. In some instances, these wavelengths are separated by an amount sufficient to provide different noise views as discussed above.

At step 1004, the optical measurement system performs a measurement using the selected pair of spectroscopically equivalent wavelengths. In these instances, this involves simultaneously generating light at the pair of wavelengths (e.g., using two light sources of the light source modules described above with respect to FIGS. 2A-9) and emitting this light from the optical measurement system. Accordingly, a portion of a sample being measured may be simultaneously illuminated by both wavelengths of the pair.

This measurement may generate a set of measured signals. For example, one or more sensing elements of one or more detectors may measure light received by the optical measurement system while the optical measurement system is emitting light at the pair of wavelengths. Each of these sensing elements may output a measured signal representing the intensity (or another characteristic) of light received by that sensing element, and these signals may collectively form the set of measured signals for that measurement. Individual signals in the set of measured signals may not distinguish between how much of the signals comes from each wavelength of the pair, and thus the optical measurement system may treat this information as if it were generated at a single wavelength.

The measurement of step 1004 may be performed at a plurality of different spectroscopically equivalent wavelength pairs. Accordingly, at step 1006 the method determines whether there are additional wavelength pairs to be measured. If there are, the method returns to step 1002 to select and perform another measurement. If all of the wavelength pairs have been measured, the method may optionally perform a series of measurements using one or more additional measurements.

In the instance that all the wavelength pairs have been measured, a wavelength is selected at step 1008. At step 1010, the optical measurement system performs a measurement using the selected wavelength. This wavelength may be a wavelength produced by an unpaired light source or may be one wavelength of a spectroscopically equivalent wavelength pair. In these instances, this involves generating light at a single wavelength and emitting this light from the optical measurement system. It should be appreciated that instances where multiple measurements are performed simultaneously, such as discussed above, this single wavelength may be emitted from one launch site of the optical measurement system and another wavelength or pair of wavelengths is emitted from a different launch site of the optical measurement system. This measurement may generate a set of measured signals in the same manner as discussed with respect to step 1006. At step 1012, the method includes checking for additional wavelengths to be measured. If there are additional wavelengths to be measured, another wavelength is selected at step 1008 and a subsequent measurement is performed at step 1012.

The measurements performed in steps 1004 and 1010 may collectively generate multiple sets of measured signals. Additionally, these measurements may be done in any order (e.g., the measurements of step 1004 need not be performed for every wavelength pair before performing some or all of the measurements of step 1010). Once all of the measurements are complete, spectroscopic information may be calculated using the sets of measured signals at step 1014. The optical measurement systems may facilitate a wide range of analytical techniques as would be readily understood by one of ordinary skill in the art, and thus individual techniques for deriving spectroscopic information from a set of measurements taken at a plurality of different wavelengths will not be discussed herein.

For a given wavelength of a pair of spectroscopically equivalent wavelengths, the optical measurement system may decide to use the wavelength alone or as part of a pair in different instances. For example, the method may include a step (not shown) that includes determining whether a pair of light sources that generate a selected pair of spectroscopically equivalent wavelengths are both able to operate according to a set of operating criteria (e.g., the light source is able to generate light at a target intensity). The operating criteria may be the same set of criteria for both light sources, or the set of operating criteria applied to one light source may be different than the set of operating criteria applied to the second light source. If both light sources are determined to meet the set of operating criteria, the optical measurement system will perform a measurement using the pair of wavelengths. Conversely, if only one light source is determined to meet the set of operating criteria, the optical measurement system will perform a measurement using the light source that met the set of operating criteria (and will thereby perform the measurement using only one wavelength of the wavelength pair). This may provide redundancy as discussed above by allowing the optical measurement system to perform a given spectroscopic measurement even after failure of one light source of a given light source pair.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A light source module having a set of outputs comprising:
    a plurality of pairs of light sources that collectively form a set of paired light sources having a first light source subset and a second light source subset, wherein each of the plurality of pairs of light sources comprises:
        a first light source configured to output light at a corresponding first wavelength, the first light source being part of the first light source subset; and
        a second light source configured to output light at a corresponding second wavelength that is different from the first wavelength and separated from the first wavelength by an amount that is less than a target separation amount of about 5 nanometers, the second light source being part of the second light source subset;
    a first multiplexer optically connected to the first light source subset and configured to multiplex light received from the first light source subset;
    a second multiplexer optically connected to the first light source subset and configured to multiplex light received from the second light source subset; and
    a multiplexing unit configured to optically connect an output of the first multiplexer and an output of the second multiplexer to the set of outputs.

2. The light source module of claim 1, wherein the corresponding first wavelength and the corresponding second wavelength for each of the plurality of pairs of light sources are separated by at least 1 nanometer.

3. The light source module of claim 1, further comprising:
    a set of additional light sources; and
    a third multiplexer optically connected to the set of additional light sources and configured to multiplex light received from the second light source subset, wherein:
        the multiplexing unit is configured to optically connect an output of the third multiplexer to the set of outputs.

4. The light source module of claim 3, wherein each of the additional light sources is configured to output a corresponding wavelength that is separated from each the corresponding first and second wavelengths of each of the plurality of pairs of light sources by a corresponding amount of at least the target separation amount.

5. An optical measurement system comprising:
    a controller; and
    a light source module having a set of outputs, comprising:
        a plurality of sets of light sources including a first set of light sources and a second set of light sources;

a plurality of wavelength-specific multiplexers, each of which has an output and is configured to multiplex a corresponding set of light sources of the plurality of sets of light sources; and a multiplexing unit configured to route the outputs of the plurality of wavelength-specific multiplexers to the set of outputs, wherein:

the controller is configured to simultaneously operate a first light source of the first set of light sources to generate light of a first wavelength and a second light source of the second set of light sources to generate light of a second wavelength, wherein the first wavelength is different from the second wavelength and the second wavelength is separated from the first wavelength by an amount that is less than a target separation amount of about 5 nanometers;

the first light source and the second light source are multiplexed to the multiplexing unit by different wavelength-specific multiplexer of the plurality of wavelength-specific multiplexers; and the multiplexing unit is configured to simultaneously output light of the first wavelength and light of the second wavelength to at least one of the set of outputs.

6. The optical measurement system of claim 5, wherein the multiplexing unit comprises a cascaded network of optical couplers.

7. The optical measurement system of claim 5, wherein the multiplexing unit comprises a first star coupler.

8. The optical measurement system of claim 7, wherein the multiplexing unit comprises:

a second star coupler; and a first controllable switch optically coupled to a first wavelength-specific multiplexer of the plurality of wavelength-specific multiplexers, wherein:

the first controllable switch may selectively route light to the first and second star couplers.

9. The optical measurement system of claim 5, wherein the light source module further comprises a wavelength locking unit.

10. The optical measurement system of claim 9, wherein:

each of the plurality of wavelength-specific multiplexers is optically connected to a controllable switch; and the wavelength locking unit is optically connected to the controllable switch.

* * * * *